US00RE35087E

United States Patent [19]

Uto et al.

[11] E Patent Number: Re. 35,087

[45] Reissued Date of Patent: Nov. 14, 1995

[54] SHEET SORTER WITH STAPLER

[75] Inventors: Nobutaka Uto, Yokohama; Hironori Shido, Miyazaki; Jun Saito, Kawasaki; Masakazu Hiroi, Yokohama; Kenji Kobayashi, Tokyo; Koichi Murakami, Yokohama; Masataka Naito, Kawasaki, all of Japan

[73] Assignee: Canon Kabushiki Kaisha, Tokyo, Japan

[21] Appl. No.: 891,168

[22] Filed: May 29, 1992

Related U.S. Patent Documents

Reissue of:

[64] Patent No.: 4,928,941
Issued: May 29, 1990
Appl. No.: 216,118
Filed: Jul. 7, 1988

[30] Foreign Application Priority Data

| | | | |
|---|---|---|---|
| Jul. 9, 1987 | [JP] | Japan | 62-172681 |
| Jul. 30, 1987 | [JP] | Japan | 62-191934 |
| Jul. 30, 1987 | [JP] | Japan | 62-191936 |
| Aug. 10, 1987 | [JP] | Japan | 62-200288 |
| Aug. 10, 1987 | [JP] | Japan | 62-200289 |

[51] Int. Cl.[6] ..... B42B 1/02; B42C 1/12

[52] U.S. Cl. ..... 270/53; 270/58

[58] Field of Search ..... 270/53, 58; 271/293

[56] References Cited

U.S. PATENT DOCUMENTS

| | | |
|---|---|---|
| 3,685,712 | 8/1972 | Turner et al. . |
| 3,884,408 | 5/1975 | Leiter et al. . |
| 3,994,427 | 11/1976 | Ganatsiou . |

(List continued on next page.)

FOREIGN PATENT DOCUMENTS

| | | | |
|---|---|---|---|
| 0099250 | 12/1985 | European Pat. Off. . | |
| 0198970 | 10/1986 | European Pat. Off. . | |
| 3210527 | 10/1982 | Germany . | |
| 3519002 | 12/1985 | Germany . | |
| 58-220053 | 12/1983 | Japan . | |
| 59-086551 | 5/1984 | Japan . | |
| 60-88969 | 5/1985 | Japan . | |
| 0118573 | 6/1985 | Japan | 271/293 |
| 0232369 | 11/1985 | Japan | 271/293 |
| 0223764 | 11/1985 | Japan | 271/293 |
| 119069 | 5/1987 | Japan | 270/53 |
| 2126997 | 4/1984 | United Kingdom . | |
| 2168037A | 6/1986 | United Kingdom | 270/58 |

OTHER PUBLICATIONS

Xerox Disclosure Journal, vol. 1, No. 4, Apr. 1976.
SN22604, Hironori Shido et al., Jul. 29, 1988.
SN226061, Hironori Shido et al., Jul. 29, 1988.
SN225803, Masataka Naito et al., Jul. 29, 1988.

*Primary Examiner*—John E. Ryznic
*Attorney, Agent, or Firm*—Fitzpatrick, Cella, Harper & Scinto

[57] ABSTRACT

A sheet sorting apparatus with a stapler, includes a plurality of bin trays, bin tray shifting device for moving the plurality of the bin trays stepwisely substantially in the vertical direction to oppose the respective bin trays to a sheet inlet of the sorting apparatus, while expanding the clearance between the bin tray opposed to the sheet inlet and an upper adjacent bin tray to provide a larger clearance than the predetermined clearances, a shaft extending substantially perpendicularly to the extension of the inclined sheet receiving surface, and a stapler, supported rotatably about the shaft and having a stapling head movable to above the sheet receiving surface in a lateral direction by rotation about the shaft and an anvil movable to below the sheet receiving surface by the rotation, for stapling the sheets interposed between the stapling head and the anvil, wherein the bin trays are so disposed that between those ends of adjacent ones of the bin trays which are closer to the sheet inlet are deviated when seen in a direction substantially perpendicular to the sheet receiving surface, and wherein the stapling head is laterally moved using a space provided by the deviation, and wherein the expanded clearance is smaller than a height of the stapling head.

30 Claims, 30 Drawing Sheets

U.S. PATENT DOCUMENTS

| | | | |
|---|---|---|---|
| 3,995,748 | 12/1976 | Looney | 270/58 X |
| 4,083,550 | 4/1978 | Pal | 270/53 |
| 4,134,672 | 1/1979 | Burlew et al. . | |
| 4,281,920 | 8/1981 | Cross | 270/53 |
| 4,295,733 | 10/1981 | Janssen et al. . | |
| 4,328,963 | 5/1982 | DuBois et al. | 271/293 |
| 4,376,529 | 3/1983 | George | 270/53 |
| 4,382,592 | 5/1983 | Harding | 270/53 |
| 4,473,219 | 9/1984 | Ichikawa | 270/53 |
| 4,478,406 | 10/1984 | DuBois | 271/293 |
| 4,497,478 | 2/1985 | Reschenhofer . | |
| 4,566,782 | 1/1986 | Britt et al. . | |
| 4,605,211 | 8/1986 | Sonobe | 270/53 |
| 4,624,241 | 11/1986 | Acquiviva . | |
| 4,627,706 | 12/1986 | Takahashi et al. . | |
| 4,681,320 | 7/1987 | Cooper | 270/53 |
| 4,687,191 | 8/1987 | Stemmle | 270/53 |
| 4,687,191 | 8/1987 | Stemmle | 270/53 |
| 4,709,915 | 12/1987 | Ishikawa et al. . | |
| 4,762,312 | 8/1988 | Ushirogata | 270/53 |
| 4,787,616 | 11/1988 | Sasaki et al. . | |

SHEET SORTER WITH STAPLER

Matter enclosed in heavy brackets [ ] appears in the original patent but forms no part of this reissue specification; matter printed in italics indicates the additions made by reissue.

FIELD OF THE INVENTION AND RELATED ART

The present invention relates to a post-processor for processing sheets of paper, for example, the sheets discharged from an image forming apparatus such as a copying machine or a laser beam printer, more particularly to a sheet sorter provided with a number of bins for sorting and accommodating the sheets and with a stapler for stapling a stack or set of the sheets in each of the bins.

A post-processor has been proposed wherein the sheets can be sorted and accommodated without limitation by the number of bins, which will hereinafter be called "limitless sorter", and wherein sets of the sheets are stapled in the respective bins.

For example, U.S. Pat. No. 3,884,408 discloses a horizontal limitless sorter of a stationary bin type wherein a carriage for carrying a stapler is movable to the respective bins, and the stapler is rotated away from the carriage to staple a stack of sheets.

Japanese Laid-Open Application No. 220053/1983 discloses a limitless sorter wherein a stapler block moves substantially vertically, expands the space between adjacent bins and inserts a stapling head into the space to staple the stack of sheets.

U.S. Pat. No. 4295,733 discloses a limitless sorter wherein a set of sheets are gripped by a gripper and is transported to a stapler by which it is stapled.

Those limitless [sorter] *sorters*, however, involve a problem that a stapling operation is time consuming, and it is difficult to increase the stapling operation speed, and a problem that the structure of the apparatus is complicated with the result of high cost. In addition, since the space between adjacent bins has to be expanded enough to allow access of the stapler to sheets, the bulkiness of the apparatus results.

SUMMARY OF THE INVENTION

Accordingly, it is a principal object of the present invention to provide a sheet sorting apparatus wherein a stapling operation can be performed smoothly without greatly expanding the space between adjacent bins.

According to an embodiment of the present invention, a stapler is inserted into the space between a bin stacking a set of sheets to be stapled and an adjacent bin, at which the leading edge (the edge closer to an apparatus from which the bin receives the sheets) of a sheets stacking surface of the bin stacking the sets of sheets to be stapled is deviated from the leading edge of the sheet stacking surface of the adjacent bin.

The sheets discharged from the apparatus are sorted and accommodated in the number of bins, and when the number of a sheets accommodated in the bin reaches a predetermined number, the stapler moves toward the sheet and staples the set of sheets.

Since the set of sheets to be stapled and the adjacent set of sheets is deviated because of the deviation described above, the stapling operation can be performed without greatly expanding the space between the adjacent bins.

According to another embodiment of the present invention, the stapler is provided with an anvil having a thickness smaller than the thickness of the bins, by which the anvil can be easily inserted into the adjacent bins.

According to another embodiment of the present invention, a bin is provided with an inclined surface toward a cut-away portion, by which the stapled sheets are taken out of the bin, the stapled portion is guided by the inclined surface, and therefore, it can be smoothly taken out.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
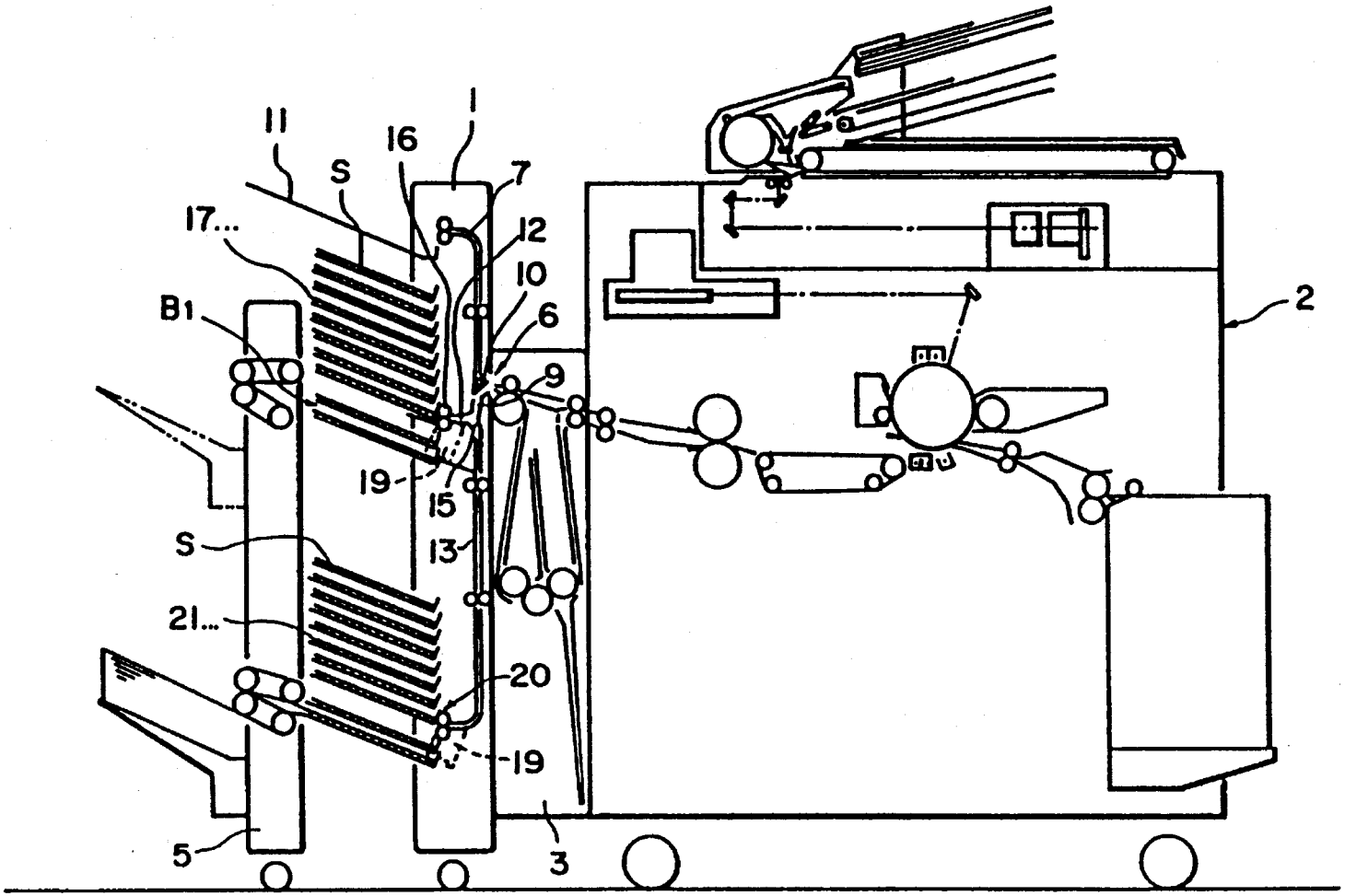
FIG. 2 is a front view of a sheet post processor apparatus according to the embodiment of the present invention.

Referring first to FIG. 2, a limitless sorter 1 according to an embodiment of the present invention is disposed downstream of a sheet folding device 3, with respect to a movement direction of a sheet, and which is attached to a laser beam printer 2. Downstream of the sorter 1, a stacker 5 is provided. The sorter 1 is provided, downstream of its sheet inlet 6, with a deflector 10 for deflecting and guiding the sheet S selectively to a passage 7 or a passage 9. Downstream of the passage 7, a non-sorting tray 11 is disposed at a upper left position of the sorter 1. Downstream of the passage 9, there is disposed a deflector 15 for deflecting and guiding the sheet S selectively to a passage 12 or a passage 13. Downstream of the passage 12, a couple of discharging rollers 16 is disposed.

A group of upper bins 17 for sorting and accommodating the sheets S is supported for substantially vertical movement downstream of the couple of discharging rollers 16. In the neighborhood of the bin 17, a stapler 19 is provided. Downstream of the passage 13, a couple of discharging rollers 20 is disposed. Further, downstream of the roller couple 20, a group of lower bins 21 for sorting and accommodating the sheets S is supported for substantially vertical movement. The stapler 19 is disposed adjacent to the bins 21.

Figure 1:
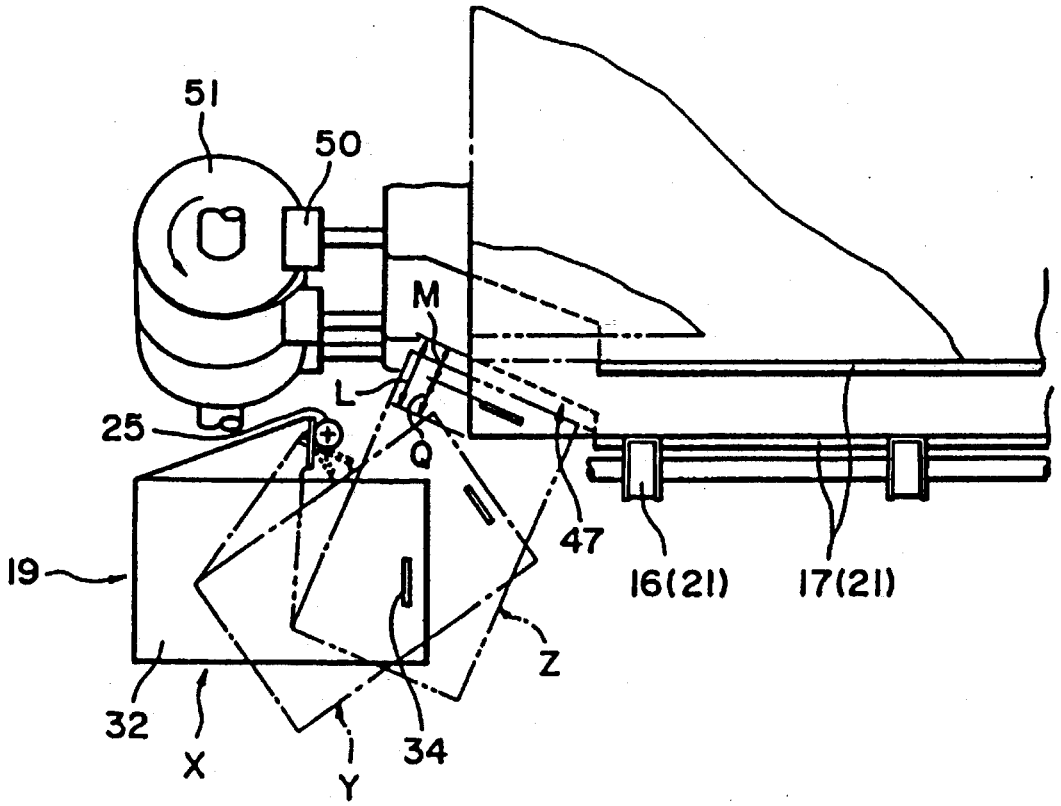
FIG. 1 is a plan view illustrating a [cutaway] *cut-away* portion of a bin in a sorter according to an embodiment of the present invention (this is a plan view taken along a line shown in FIG. 4).
Figure 3:
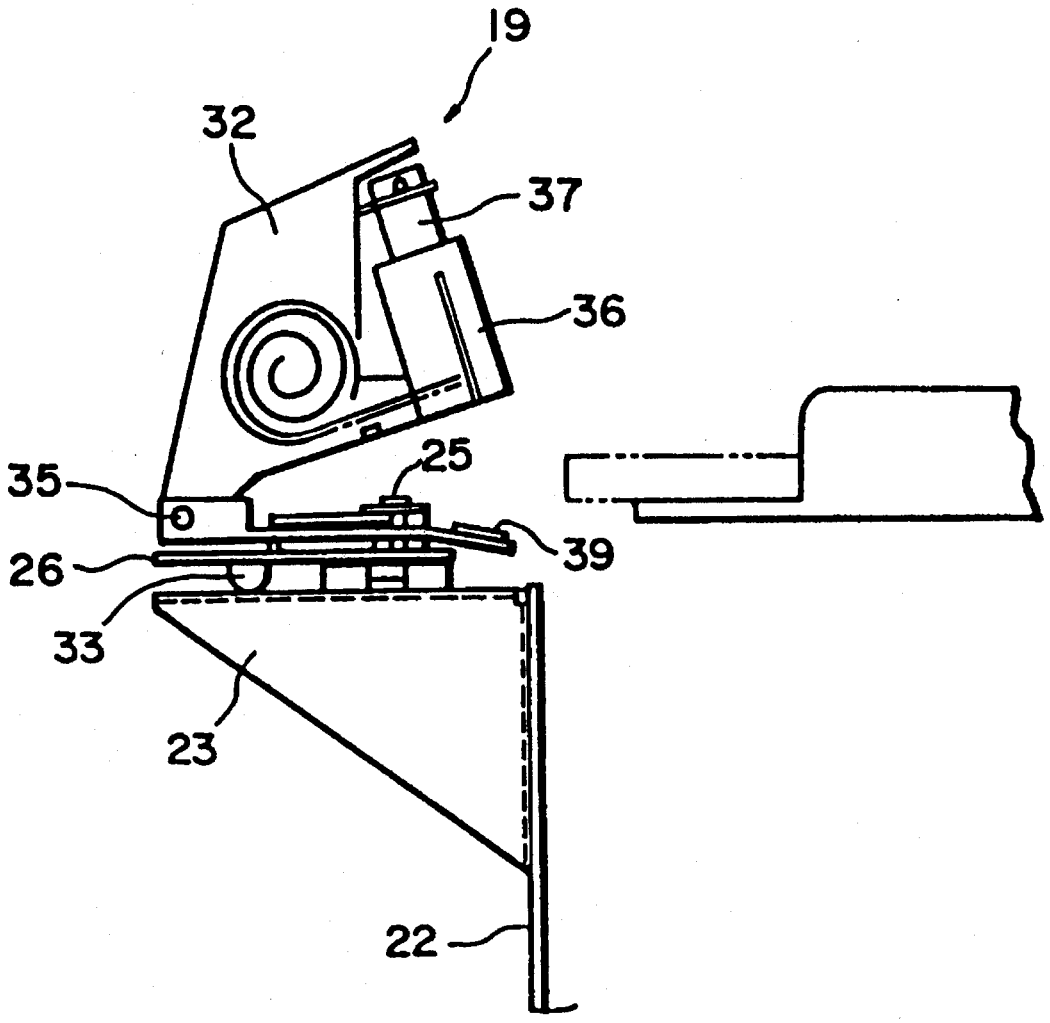
FIG. 3 is a side view of the apparatus.
Figure 4:
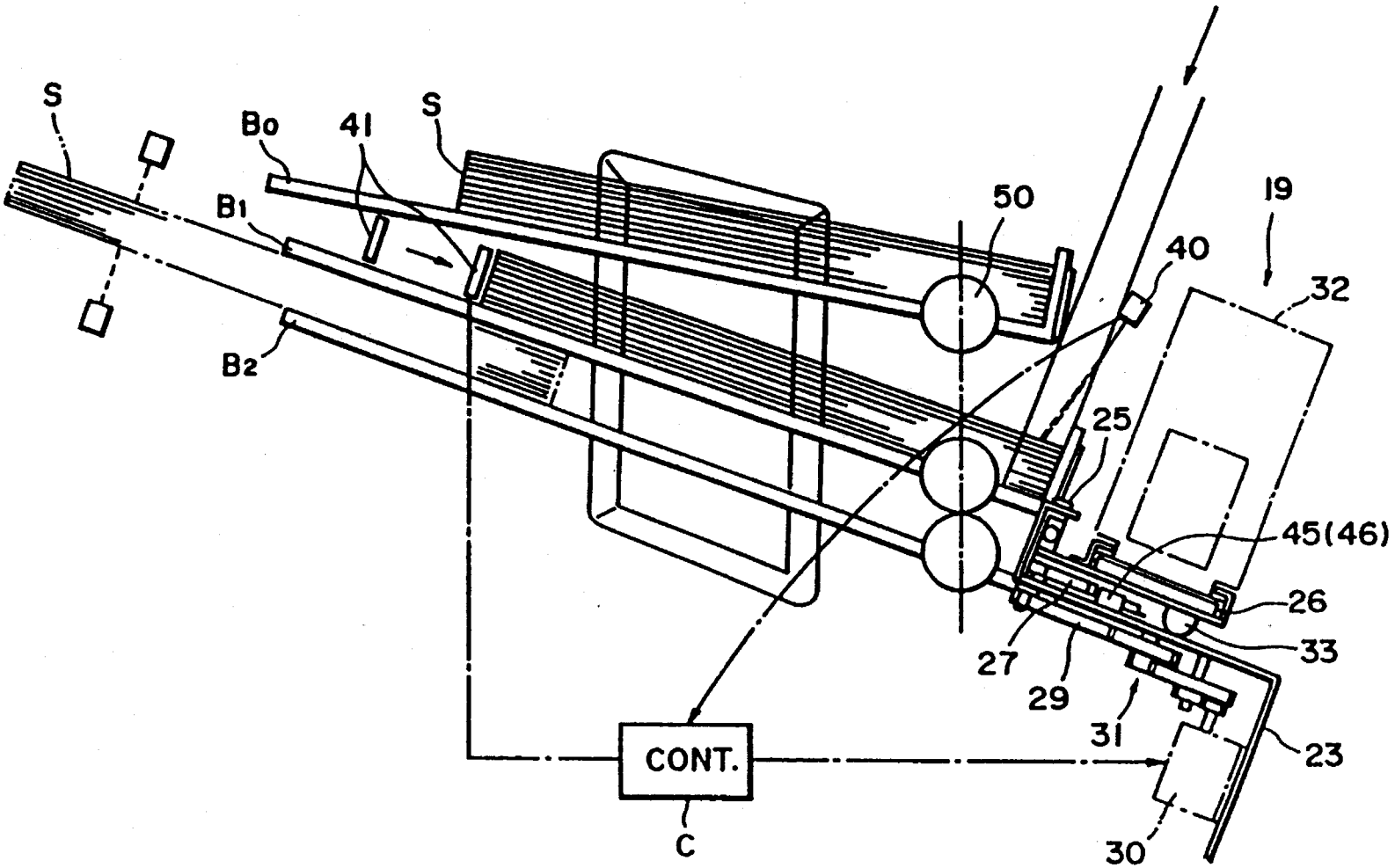
FIG. 4 is a front view of a bin.
Figure 9:
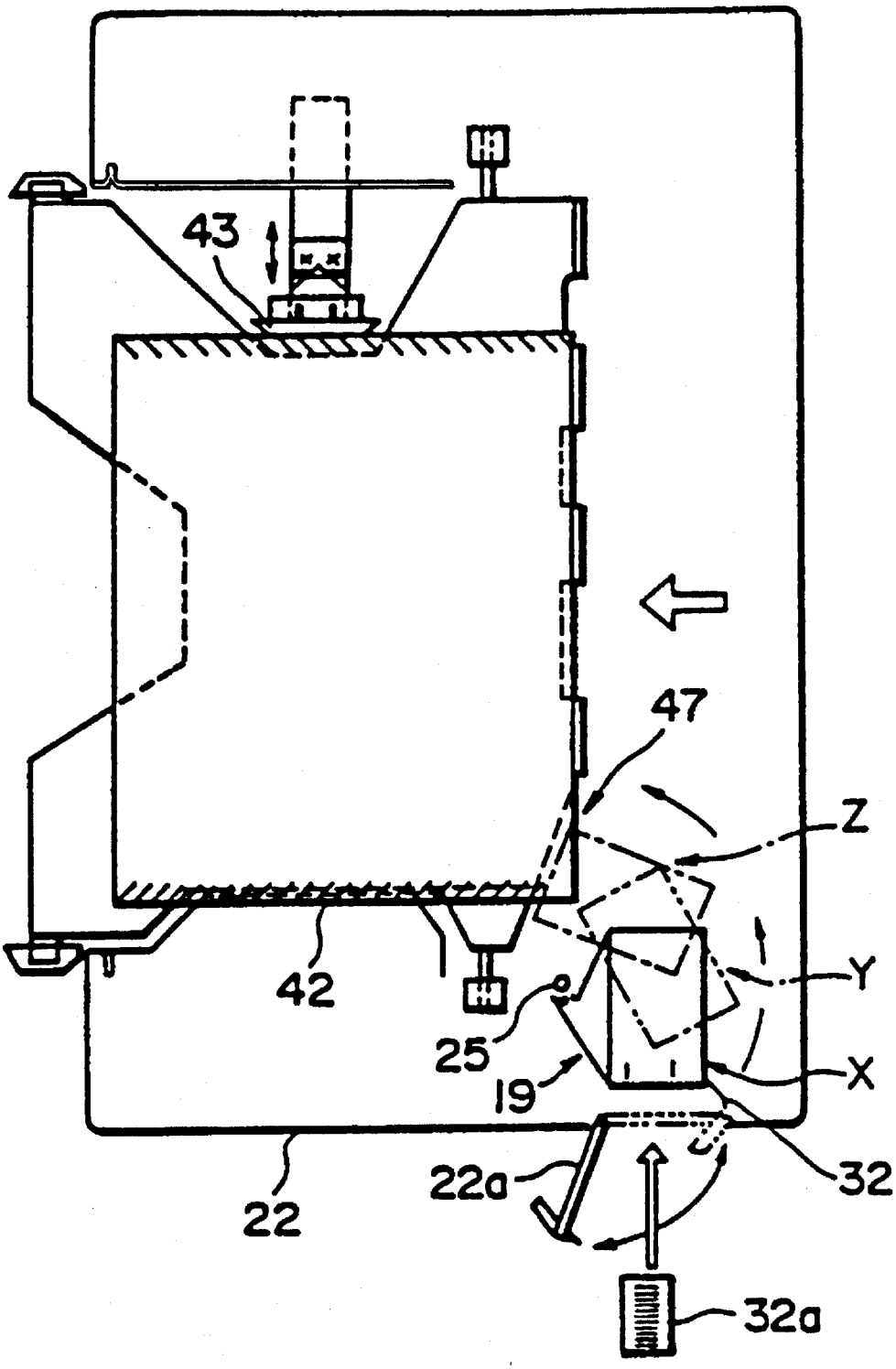
FIG. 9 is a top plan view of a guide for aligning the sheets.

Referring to FIGS. 1, 3 and 4, the stapler 19 has a shaft 25 rotatably mounted on a bracket 23 fixed on a side frame plate 22 of the sorter 1. To the shaft 25, a base plate 26, a cam 27 and a sector gear 29 are fixed. Below the bracket 23, a motor 30 is provided, and the driving force of the motor 30 is transmitted to the sector gear 29 through a gear train 31. A stapler head 32 is fixed on the base plate 26. A part 22a of the side plate 22 is openable to provide an opening therein, through which a stapler cartridge 32a can be mounted into the stapler head 32 (FIG. 9). The bottom side of the base plate 26 has a sling bush 33 fixed thereto, the sliding bush 33 being contacted to the bracket 23 to support the stapler head 32. The stapler head 32 is mounted on the base plate 26 by a shaft 35 for up and down rotatable movement. The stapler head 32 is provided at its front end with a stapling unit 36 and a plunger 37 for driving the stapling unit 116. Opposed to the stapling unit 36, there is an anvil 39 for bending a staple 34. Each of the upper and lower groups of the bins 17 and 21 is provided with a sheet detecting sensor 40 for detecting the presence [of] *or* absence of a sheet S, a sheet alignment sensor 41 for detecting alignment of a sheet S, a control device C for receiving signals from the sensors 40 and 41 and fixed guide 42 and a movable guide 43 for aligning the sheet S in the lateral direction (FIG. 9).

Figure 5A:
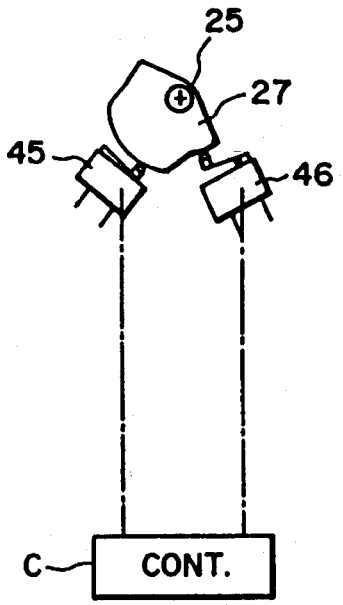
FIGS. 5A, 5B and 5C are top plan views illustrating an operation of a cam.
Figure 5B:
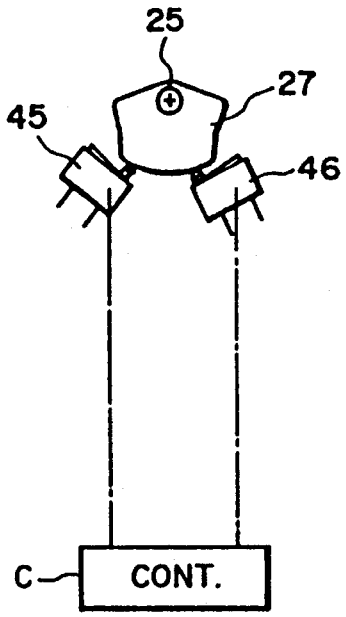
Figure 5C:
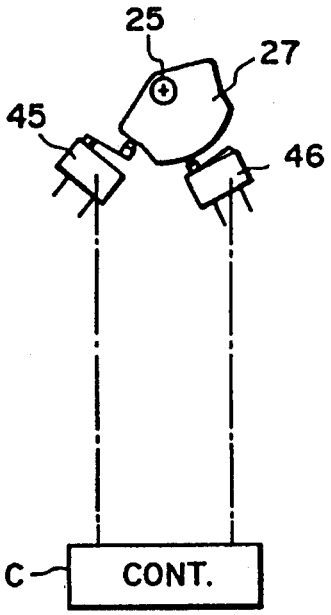
Figure 6:
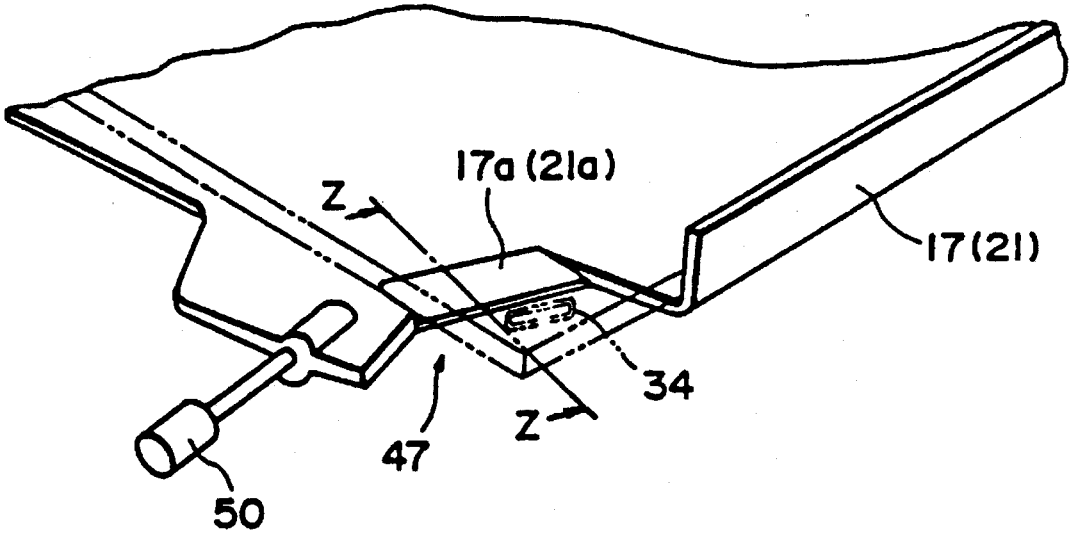
FIG. 6 is a perspective view of a bin illustrating a cut-away portion.
Figure 7:
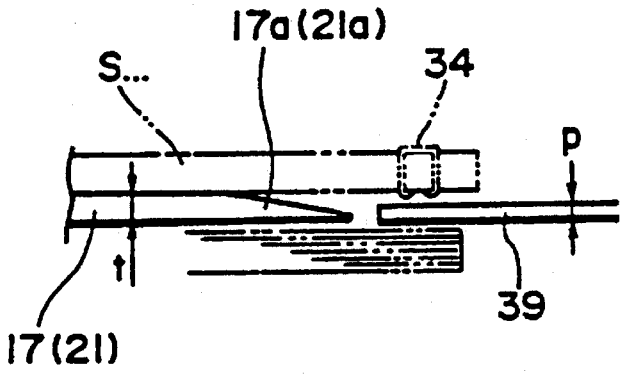
FIG. 7 is a front view of the bin of FIG. 6.
Figure 8:
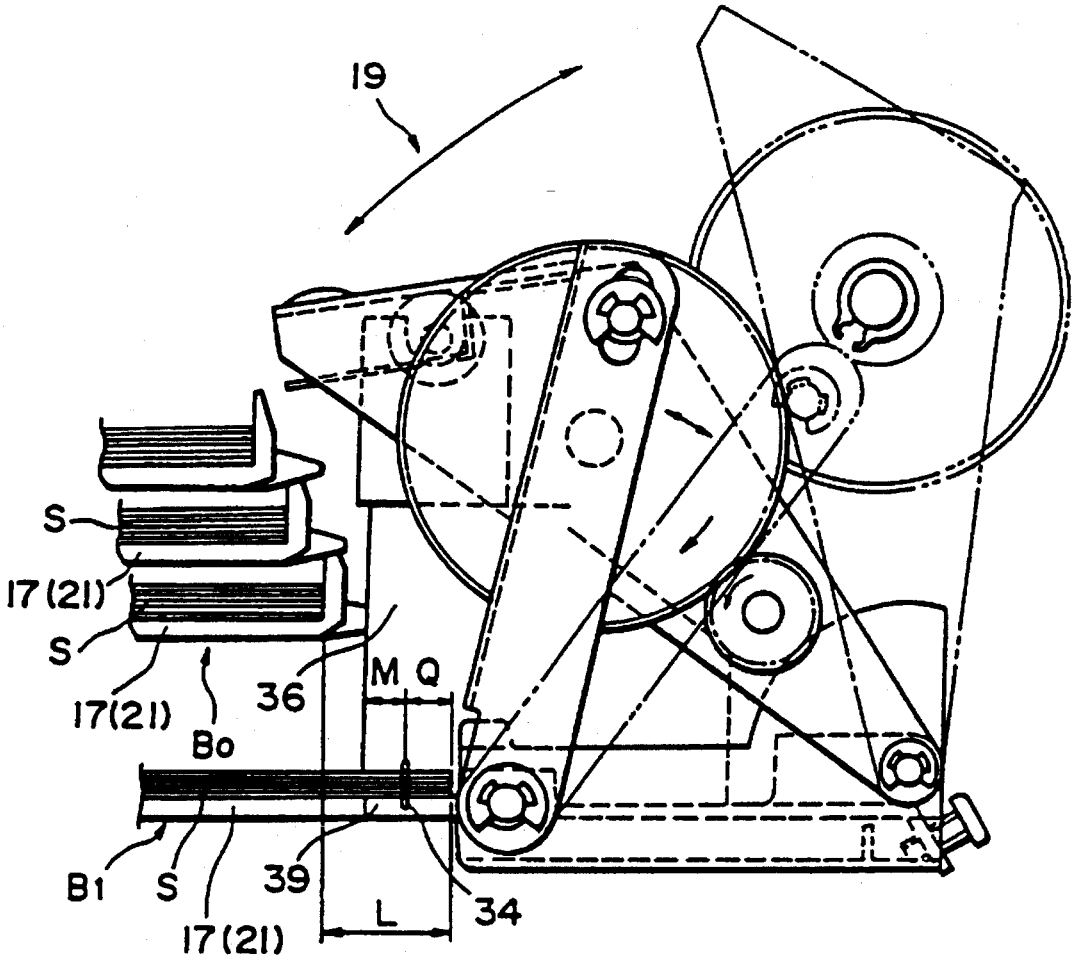
FIG. 8 is a front view illustrating an arrangement of bins and a stapler, wherein the sheet is shown as having been made horizontal, but the sheet is actually inclined corresponding to the inclination of the bin.

As shown in FIGS. 5A, 5B and 5C, in association with the cam 27, microswitches 45 and 46 are provided which are actuated or deactuated by rotation of the cam 27.

As shown in FIGS. 1, 6–8, each of the bins 17 and 21 is equipped with rollers or trunions 50 which are rotatable and effective to support a base side of the bin 17 or 21. The roller 50 is adapted to being engaged with a groove of the lead cam 51 and is moved up and down by the rotation of the lead cam 51 to move the bins 17 and 21 substantially vertically. The leading edge sides of the bins 17 and 21 are supported by an unshown supporting means.

At a left corner at the base side of each of the bins, there is provided a cut-away portion 47, and the end portions 17a and 21a of the bins 17 and 21 constituting a part of the cut-away portion 47 are inclined upwardly from the leading edge side toward the base side of the bin 17 or 21. The thickness t of the bins 17 and 21 is larger than the thickness p of the anvil 39. The bin 17 (21) positioned at a stapling position B1 as shown in FIG. 4, is disposed upstream of the bin 17 (21) disposed thereabove B0 by a predetermined distance L with respect to the sheet conveyance direction.

Here, the following is satisfied:

$$L \geqq M+Q$$

where Q is a distance from a trailing edge of the sheet S supported on the bin 17 (21) at the stapling position B1 to a position where the staple 34 is shot, M is a distance from the position where the staple 34 is shot to a front edge of a stapling unit 36.

Referring back to FIG. 4, the bin 17 is inclined downwardly toward a sheet inlet side, and is moved with the space with the adjacent bin being increased and decreased in response to the vertical movement of the trunion 50. As will be understood from FIG. 4, a gap A is formed between the leading edge (the sheet inlet side) of the tray placed at a sheet receiving position and that of the bin thereabove, as seen from a direction substantially perpendicular to a sheet supporting surface of the bin. A similar gap is formed between the bin at the sheet receiving position and the bin below it, but this gap is small.

The above-described shaft 25 extends substantially perpendicularly to the sheet supporting surface of the bin, so that the stapler 19 rotates in a plane substantially perpendicular to the sheet of the drawing of FIG. 4. By this rotation, the stapler head 32 of the stapler 19 approaches the top surface of the stack of the sheets on the bin through the gap from a lateral side of the bin, and simultaneously, the anvil 39 approaches toward the bottom side of the stack of the sheets through a space between the bins.

Therefore, the space between the bins is not required to be larger than the height of the stapler head 32, and the stapling operation is possible with the relatively small space between the bins.

In operation, a printed sheet S discharged from the laser beam printer 2 is fed to the folding apparatus 3 where it is two-folded or z-folded, and is conveyed to the sorter 1. The sheet S is guided to the passage 7 by the deflector 6 and is discharged to the non-sort tray 11 through the passage 7, if the sheet S is a copy produced in a single copy mode, or a special sheet such as an OHP sheet and a post card, or a sheet having a size larger than the bins 17 and 19, or a sheet folded in a special manner. If the sheet S has one of predetermined sizes and is one of the sheets to be discharged as a set, the sheet S is guided by the deflector 6 to the passage 9, and is further guided to the passage 12 by the deflector 15. The sheet S is then discharged through the passage 12 by the discharging roller couple 16 to the bottommost bin 17 of the bin group 17 placed at the position B1.

The discharged sheet S is laterally aligned by the movable guide 43 pushing the sheet S to the fixed guide 42, and is aligned in the sheet conveyance direction to the leading edge side by the inclination of the bin 17. In the similar manner, the sheets S are discharged to the respective bins from the bottom to the top. When an unshown counting means detects that the number of the sheets S received by each of the bins 17, the control device C receives the output signal from the counting means, and confirms the presence of the sheet S by the sheet sensor 40, and in addition, further confirms the alignment of the set of the sheets by the sheet alignment sensor 41. If the sheet sensor 40 is actuated, and the sheet alignment sensor 41 detects satisfactory alignment, the control device C [energize] *energizes* the motor 30, by which the sector gear 29 is rotated through the gear train 31. The rotation of the sector gear 29 is transmitted to the shaft 25 to rotate it, thereby moving the stapler 25 from the home position X to the cut-away portion 47, that is, the stapling position Z (FIGS. 1 and 9). The cam 27 moving integrally with the stapler 25 moves from a position (FIG. 5A) where it actuates the microswitch 45 and deactuates the microswitch 46 to a position where it deactuates the microswitch 45 and actuates the microswitch 46. On the basis of the off-signal of the microswitch 45 and the on-signal of the microswitch 46, the control device C detects the movement of the stapler 25 to the stapling position Z.

Subsequently, the control device C further confirms the alignment of the set of the sheets by the sheet alignment sensor 41. If the alignment is not satisfactory, a warning signal is produced. If the alignment is satisfactory, it swingingly moves the head 32 by an unshown driving means provided in the stapler head 32, so that the stapling unit 36 and the anvil 39 sandwich the set of the sheets S adjacent a corner of the sheets at the upstream side and at the front side. The plunger 37 is actuated to staple the sheets. After the stapling operation, the stapler 19 is moved away from the stapling position Z to a position not interfering with movement of the bin 17. Simultaneously, the cam 27 moves integrally with the stapler 19 from the position for deactuating the microswitch 45 and actuating the microswitch 46 to a position where both of the microswitches 45 and 46 are actuated (FIG. 5B). On the basis of the on-signals of the microswitches 45 and 46, the control device C detects the stapler 19 having moved to the position Y. The control device C then actuates an unshown driving means to lower the group of the bins 17 by one stage, whereby the bin 17 having been disposed at the position B0 is shifted to the position B1, and the bin 17 having been disposed at the position B1 carrying the stapled sheets is lowered to a position B2. Subsequently, the set of the sheets S having been stapled and being placed on the bin placed at the position B2, is conveyed by an unshown sheet conveying device to a stacker 5, on which the set of the sheets S is stacked. The set of the sheets S stacked on the bin now placed at the position B1 are similarly stapled by the stapler 19 moved to the stapling position Z from the position Y, and then is conveyed to and stacked on the stacker 5. Again, after the stapling operation, the stapler 19 is moved back to the position Y and is stopped. The similar operation is repeated for all of the bins 17 to staple all the sets of the sheets S stacked on the bins 17, and the stapled sheets are conveyed to and stacked on the stacker 5.

[The] *Similar* operations are further repeated for the bins 21, and all the sets of the sheets S stacked on the bins 21 are stapled and are stacked on the stacker 5.

Figure 10A:
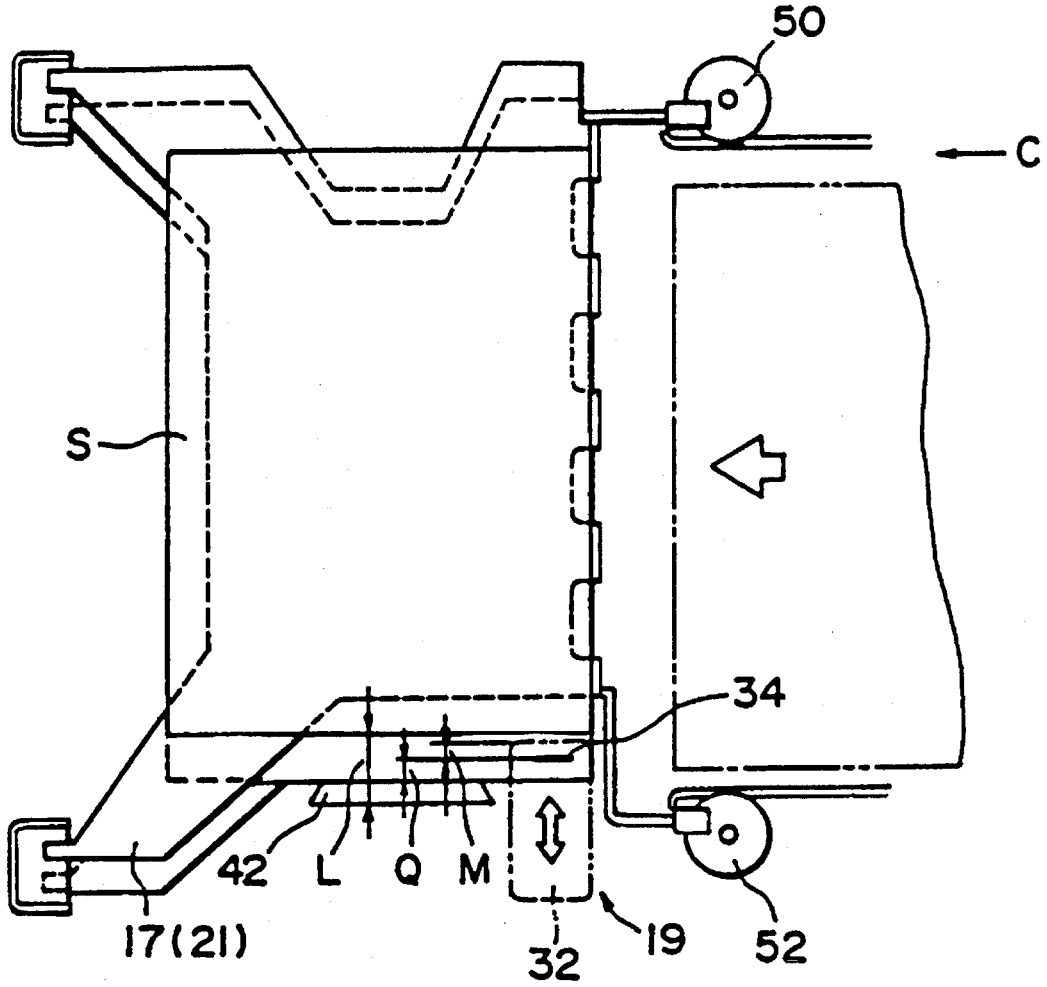
FIG. 10A is a top plan view of a bin which is deviated laterally.
Figure 10B:
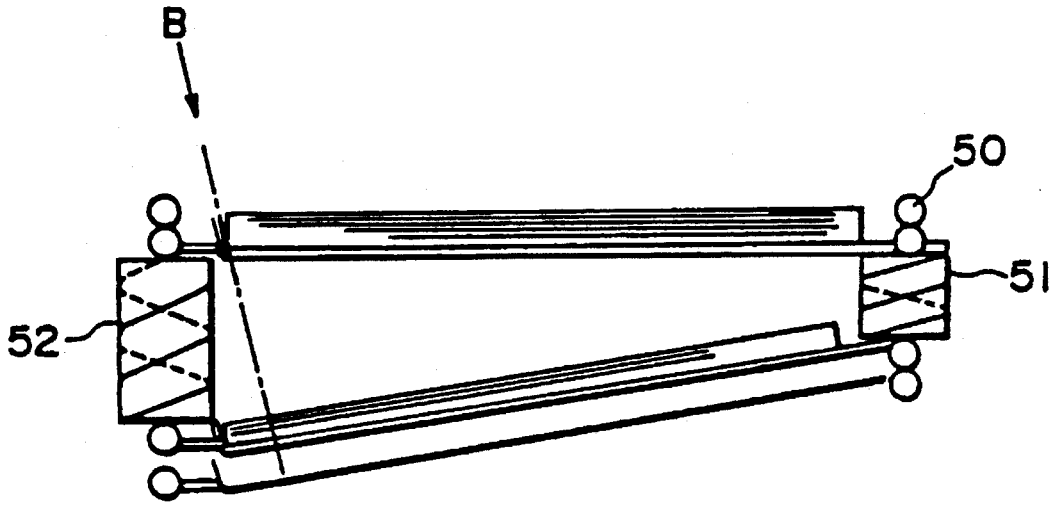
FIG. 10B is a view seen from C in FIG. 10A.
Figure 12A:
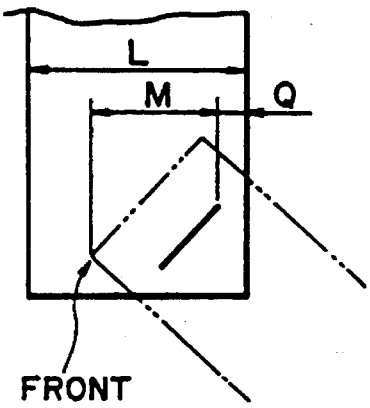
FIGS. 12A, 12B and 12C are top plan views of a sheet wherein various stapling directions are shown.
Figure 12B:
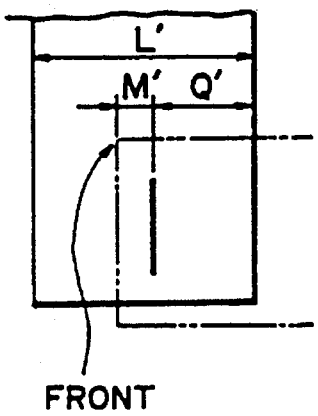

Referring to FIGS. 10A, 10B and 12B, there is shown a structure wherein the bin 17, *by action of lead cam 51 and cam 52,* is also shifted in a direction perpendicular to the sheet conveying direction. In this case also, the same effects can be provided by satisfying:

$$L' \geqq Q' + M'$$

Figure 11:
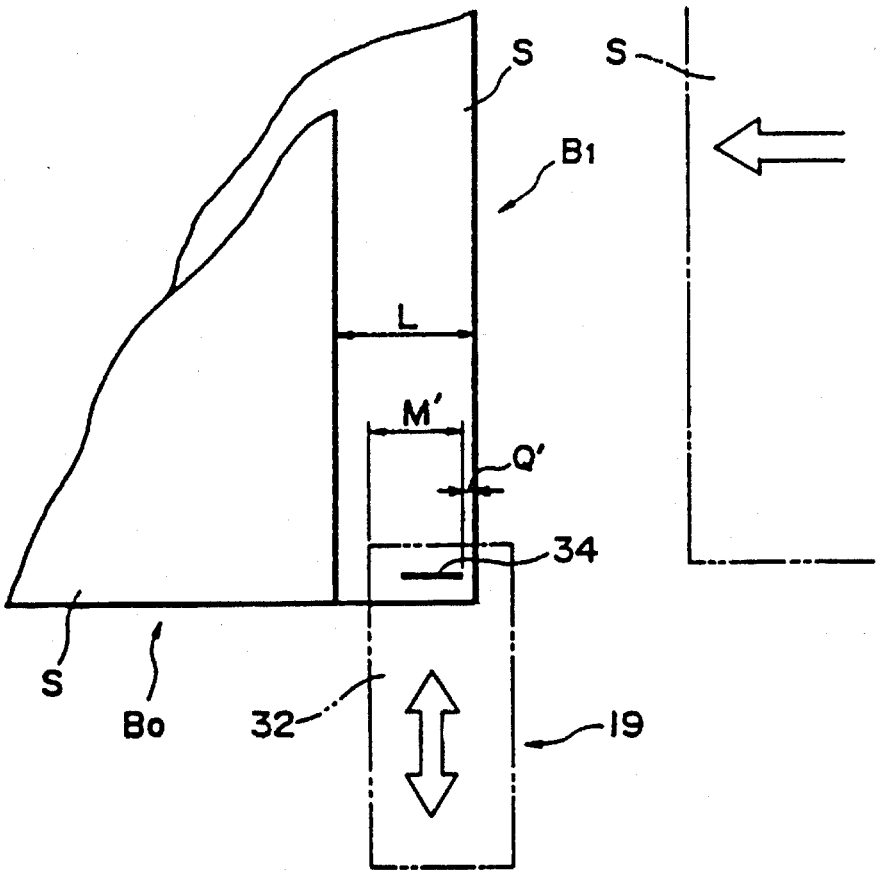
FIG. 11 is a top plan view of sheets wherein they are stapled in a direction parallel to a sheet conveying direction.
Figure 12C:
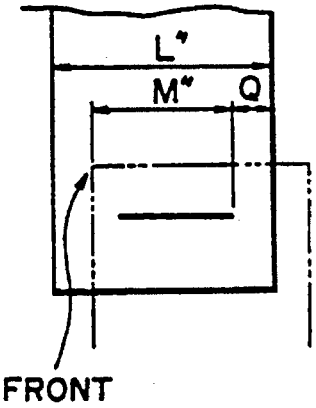

Referring to FIGS. 11 and 12C, even when the stapling is effected such that the staple after binding the sheets extends parallel to the sheet conveying direction, and the sheet is deviated in the sheet conveying direction, similar effects can be provided by satisfying:

$$L'' \geqq Q'' + M''$$

where Q" is a distance from a trailing edge of the sheet to a trailing edge of the staple 34, and M" is a distance from the trailing edge of the staple 34 to the front edge, side edge in this case, of the stapler head 32.

Referring to FIGS. 13–24, a mechanism for alignment of the sheets will be described.

Figure 14:
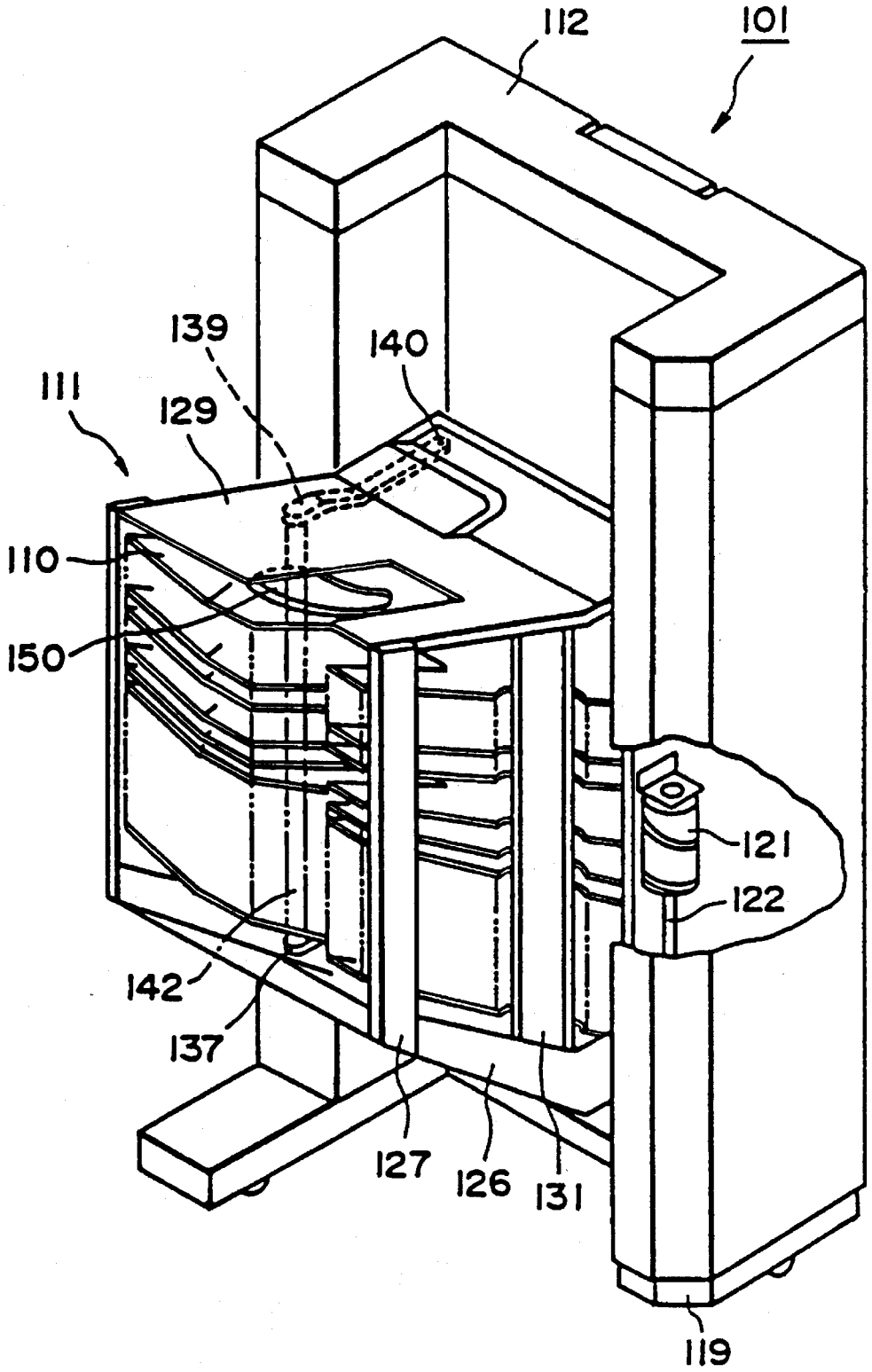
FIG. 14 is a perspective view of the post-processor of FIG. 13.
Figure 15:
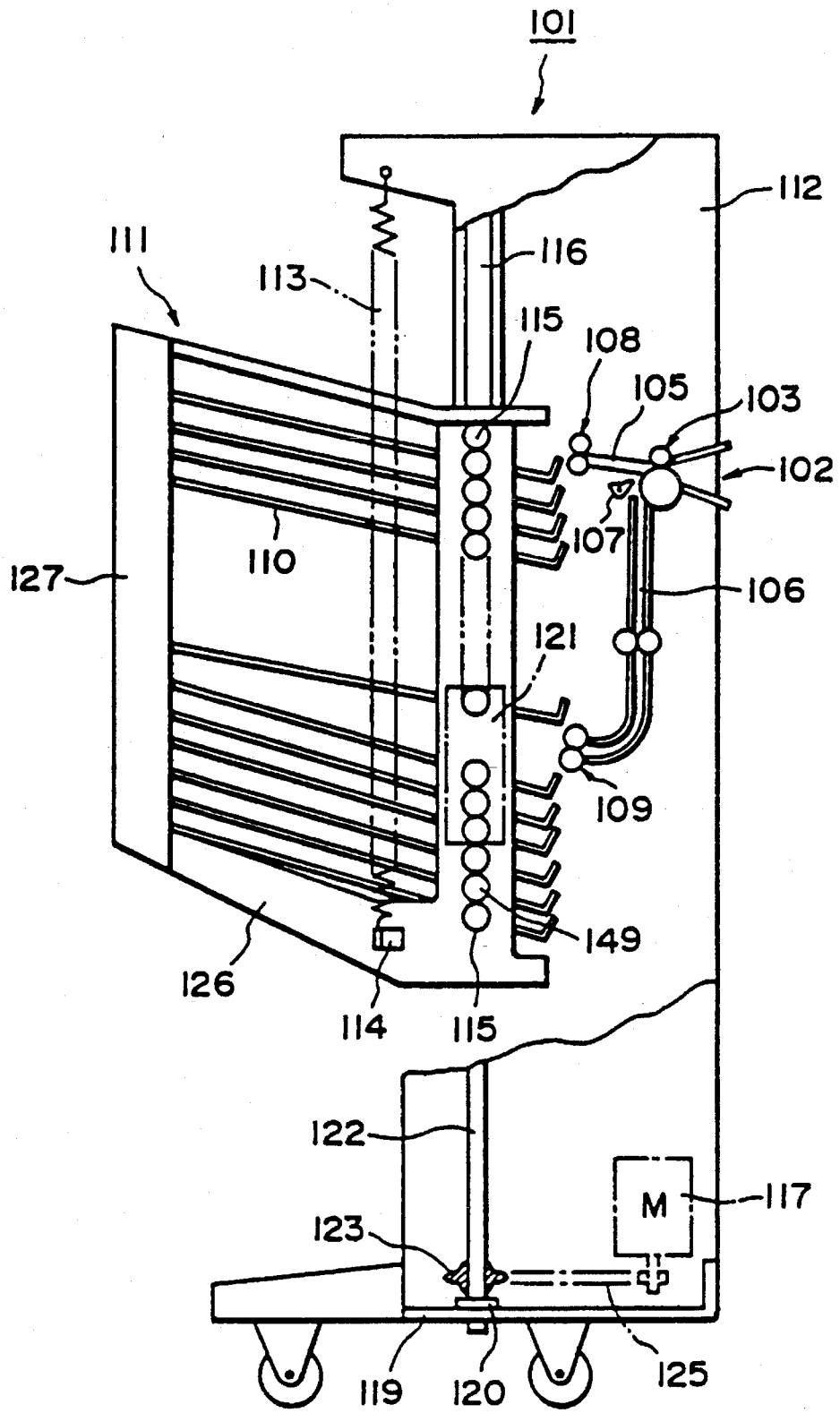
FIG. 15 is a front view of the post-processor of FIG. 14.

As shown in FIGS. 14 and 15, a sorter 101 comprises a main assembly 112 and a bin unit 111. The main assembly 112 includes a couple of sheet receiving rollers 103 adjacent to its sheet receiving inlet 102. Downstream of the sheet receiving rollers 103, there is provided a flapper 107 for deflecting a sheet selectively to a conveying passage 105 or to a conveying passage 106. One 105 of the passages extends substantially horizontally, and a couple of discharging rollers 108 is disposed downstream thereof. The other one of the passages 106 extends downwardly, and a couple of discharging rollers 109 is disposed downstream thereof. Downstream of the discharging roller couples 108 and 109, the bin unit 111 having a number of bins 110 is mounted for substantially vertical movement, through a spring 113 having an end fixed to the main assembly and another end hooked with a hook 114, the spring 113 being effective to receive the weight of the bin unit 111.

Figure 18:
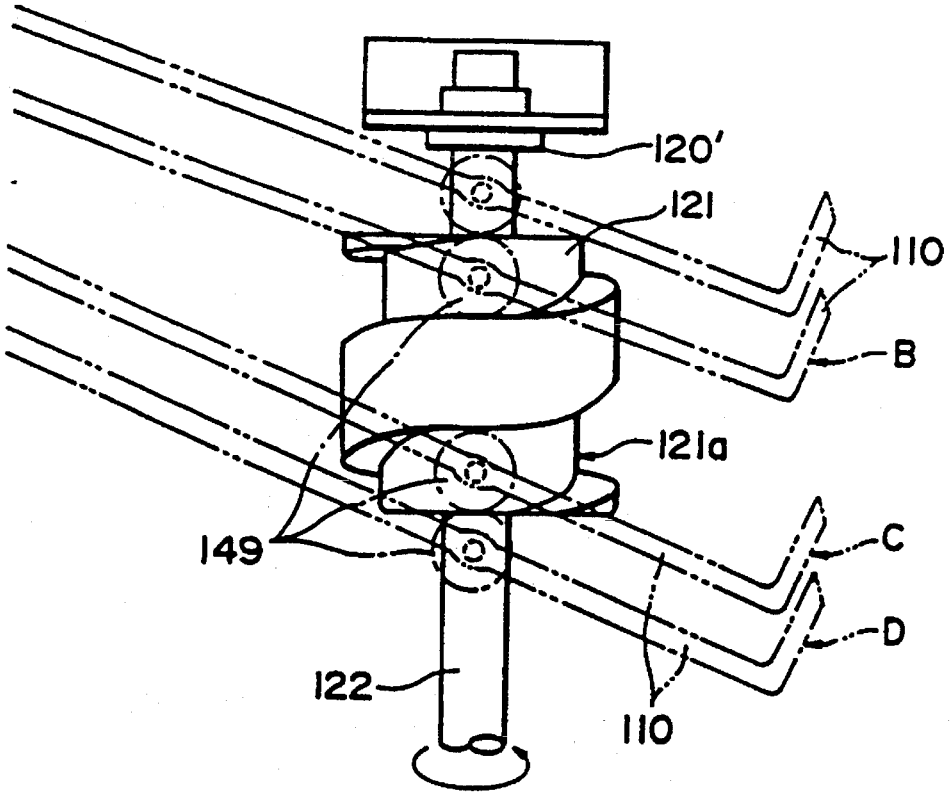
FIG. 18 is a front view illustrating a lead cam and bins.

To upper and lower portions of a base lateral side of each of the bin units 111, guide rollers or trunions 115 and 115 are rotatably mounted. The rollers 115 and 115 are rotatably engaged with a guiding groove 116 formed in the main assembly 112 extending substantially vertically, by which the rollers 115 and 115 roll in the groove 116 to guide the bin unit 111. The main assembly 112 has a driving motor 117, and its base plate 119 is provided with a thrust bearing 120. The thrust bearing 120 receives the thrust load of the rotational shaft 122 at its bottom end. The top end portion of the shaft[112] *122* is rotatably supported in a bearing 120' (FIG. 18). The shaft 122 (*erroneously identified as element*

Figure 19:
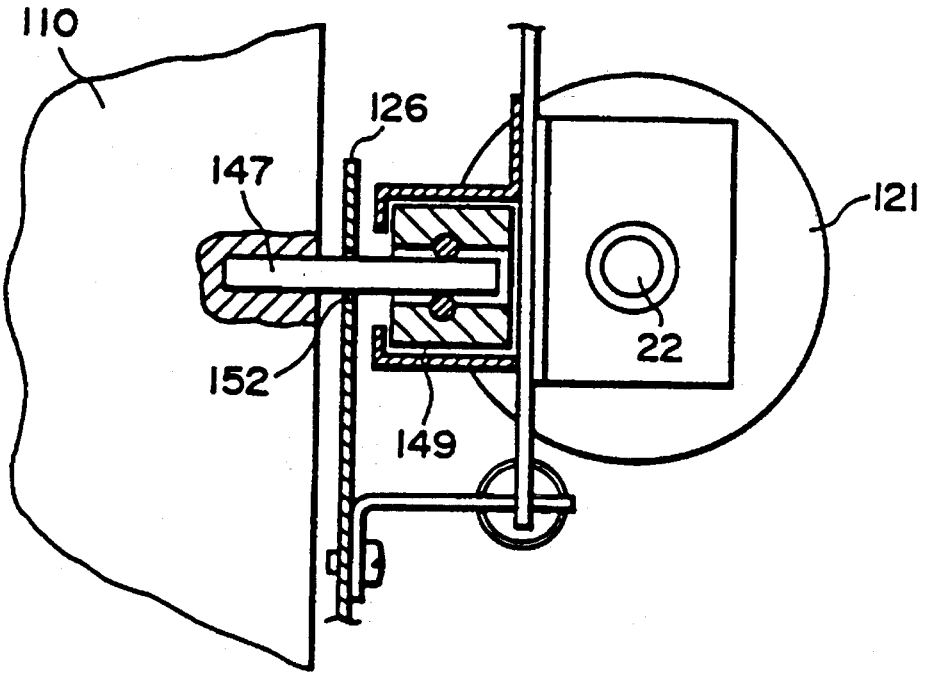
FIG. 19 is a top plan view of the lead cam and the bin of FIG. 18.

*22 in FIG. 19*) has a lead cam 121 and a sprocket 123 fixed thereto. Between the sprocket 123 and a shaft of the motor 117, a chain 125 is stretched, by which the rotation of the motor 117 is transmitted through the chain 125 to the rotational shaft 122 (*erroneously identified as element 22 in FIG. 19*) .

Figure 13:
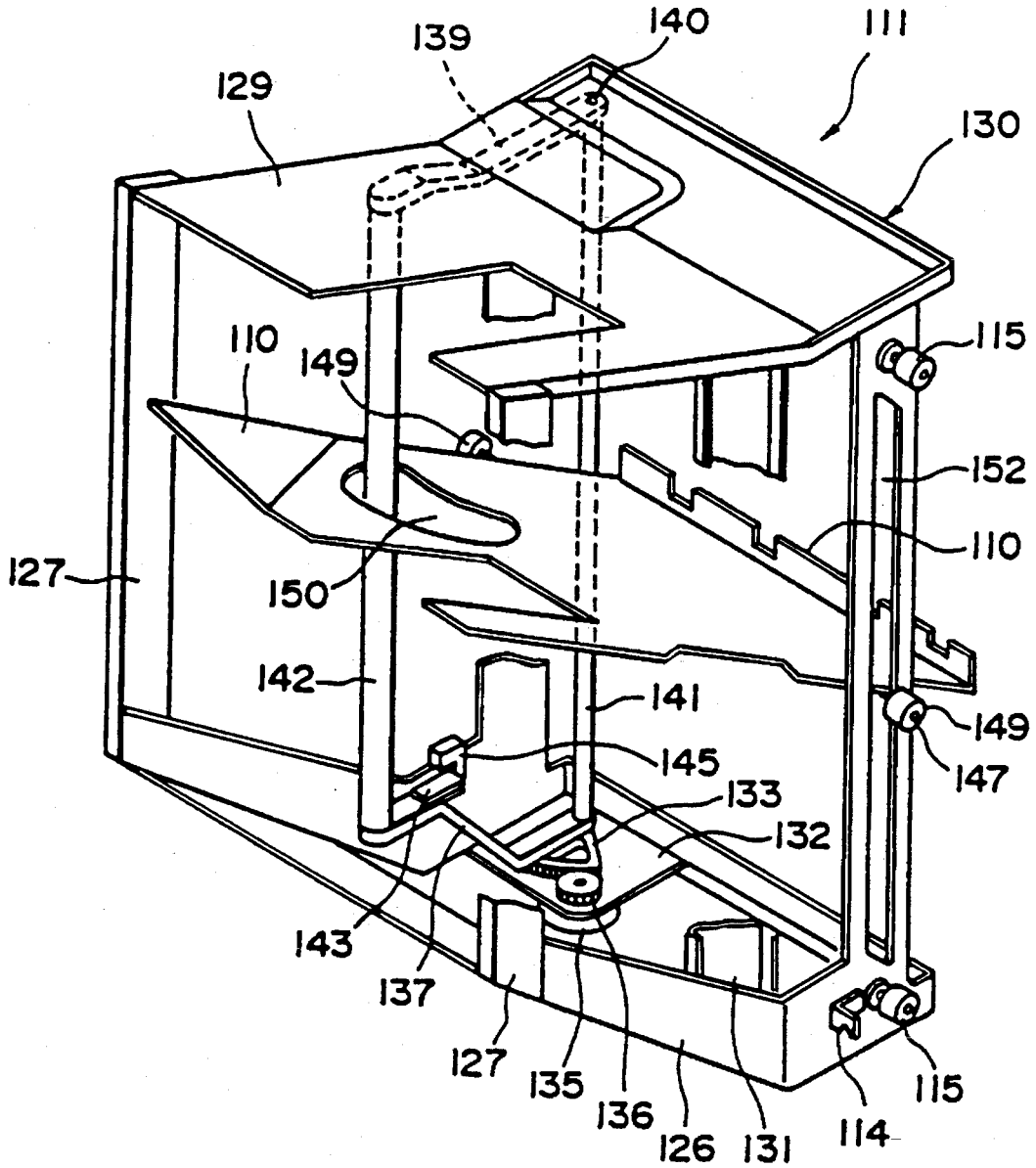
FIG. 13 is a perspective view of a post-processor apparatus according to another embodiment of the present invention, wherein bins and aligning member are illustrated.

As shown in FIG. 13, the bin unit 111 has a main frame 130 including a bottom frame 126 having an inclined portion and a horizontal portion, up-standing frames 127 and 127 disposed front and rear sides of the bottom frame 126 and a cover 129 supported by the frames 127 and 127. At the front side of the main frame 130 of the unit 111, an alignment reference plate 131 is disposed to which the sheets are abutted. To the frame 126 a supporting plate 132 is fixed at a base side. A sector gear 133 is rotatably supported on the supporting plate 132. Below the supporting plate 132, a pulse motor 135 is disposed, and the motor 135 has an output shaft to which a gear 136 is fixedly mounted, and the gear 136 is meshed with the sector gear [136] *133*. To the sector gear 133, a lower arm 137 is fixed to be rotatable integrally with the sector gear 133. At the position opposed to the arm 137 of the cover 129, an arm 139 is mounted to a shaft 140 rotatably supported on the cover. A shaft 141 is mounted at the common pivot of the arm 139 and the arm 137. Between an edge of the arm 137 and the edge of the arm 139, an alignment rod is extended, which is swingable by the sector gear [136] *133* through the arms 137 and 139. The arm 137 has a light blocking plate 143 fixed thereto, by which when the light blocking plate 143 rotates together with the arm 137, it actuates and deactuates a home position sensor 145 disposed adjacent a rear side of the frame 126.

Figure 16:
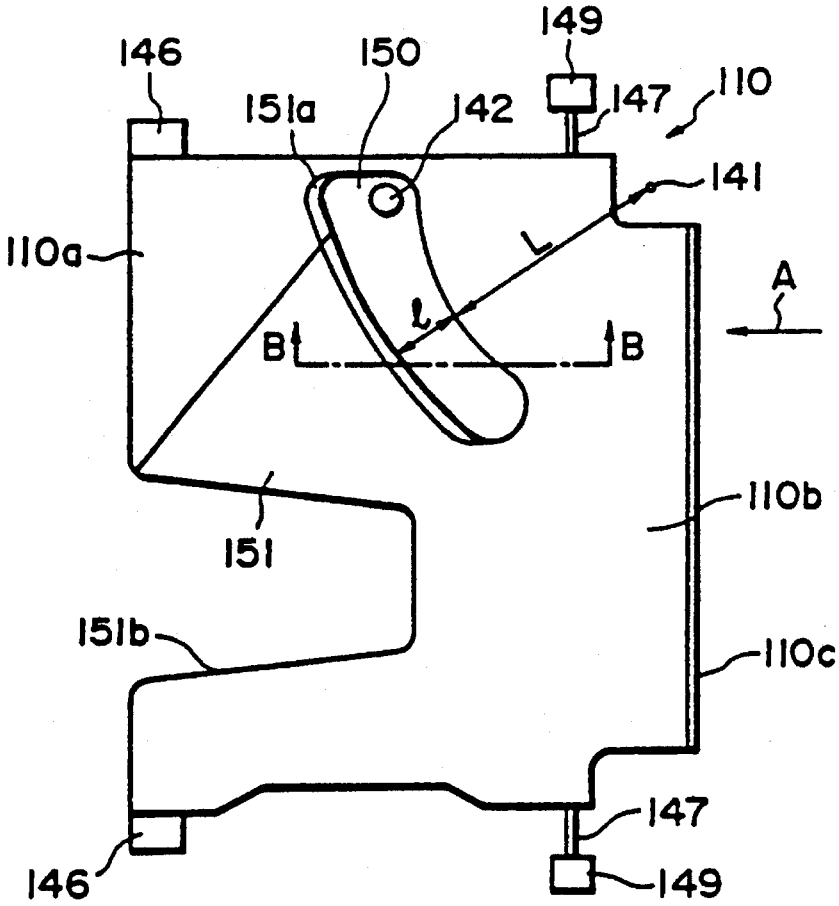
FIG. 16 is a top plan view of a bin used in the apparatus of FIG. 13.
Figure 17:
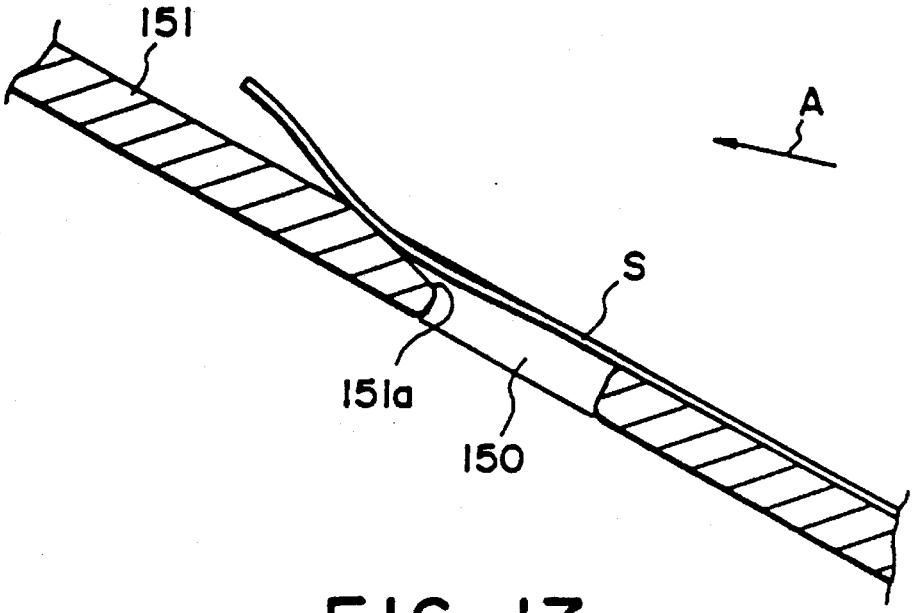
FIG. 17 is a sectional view taken along the lines B—B in FIG. 16.

As shown in FIG. 16, the bin 110 is provided with engaging plates 146 at front and free end side and at the rear free end side, respectively. The engaging plate 146 engages an unshown supporting plate disposed inside the frame 127 to support the free end side of the bin 110. The bin 110 is further provided wish supporting shafts 147 at the front base side and the rear base side thereof, respectively. Each of the supporting shafts 147 has a roller 149 rotatably mounted thereto. The bin 110 has an elongated slot 150 extending a predetermined distance (L) away from the shaft 141. The slot 150 is longer than the rotational distance through which the alignment rod 142 is movable and has a width sufficiently larger than the diameter of the alignment rod 142 (minimum width is 1). The downstream surface of the slot 150 with respect to the sheet discharging direction A, is tapered 151a (FIG. 17). The corner portion 110a of the bin 110 at the free end and rear side is inclined at a predetermined angle with respect to a sheet supporting surface 110b. The base side 110c extends perpendicularly to the sheet supporting surface 110b. The bin 110 itself is inclined upwardly toward the free end. By this inclination, the sheet is aligned in the sheet conveying direction by the sheet sliding on the sheet supporting surface 110b so that its trailing edge abuts the perpendicular portion 110c. A cut-away portion 151b is formed extending from the free end of the bin 151 generally to the center of the sheet supporting surface 110b to facilitate the operator taking out small size sheets stacked on the sheet supporting surface 110b.

As shown in FIG. 13, 14 and 15, the bin 110 is guided by the rollers 149 penetrated through elongated slots 152 formed in the frames 126, the rollers 149 being engaged with the guiding grooves 116. The roller 149 for the bottommost bin 110 is placed on a guiding roller 115. The roller 149 of the bin 110 right above the bottommost bin 110 is placed on the roller 149 of the bottommost bin 110. In this manner, a bin 110 is supported by its roller 149 being supported by the roller 149 of the bin right below it, and the base sides of the bin 110 are supported. Through the elongated slots 150 of the bins 110, the alignment rod 142 is penetrated, and it functions to abut and align the sheet S to the alignment reference plate 131 by its swinging action through the slot 150.

As shown in FIGS. 18 and 19, the lead cam 121 has a spiral groove 121a having a width slightly larger than the diameter of the roller 149. The groove 121a is engaged with the roller 149, so that the rotation of the lead cam 121 moves the roller 149 along the groove 121a vertically.

In operation, the sheet S, discharged from an image forming apparatus after being subjected to an image forming operation is received by the main assembly 112 through the sheet inlet 102 by the couple of receiving rollers 103. The rollers 103 convey the sheet S to the flapper 107.

Figure 20:
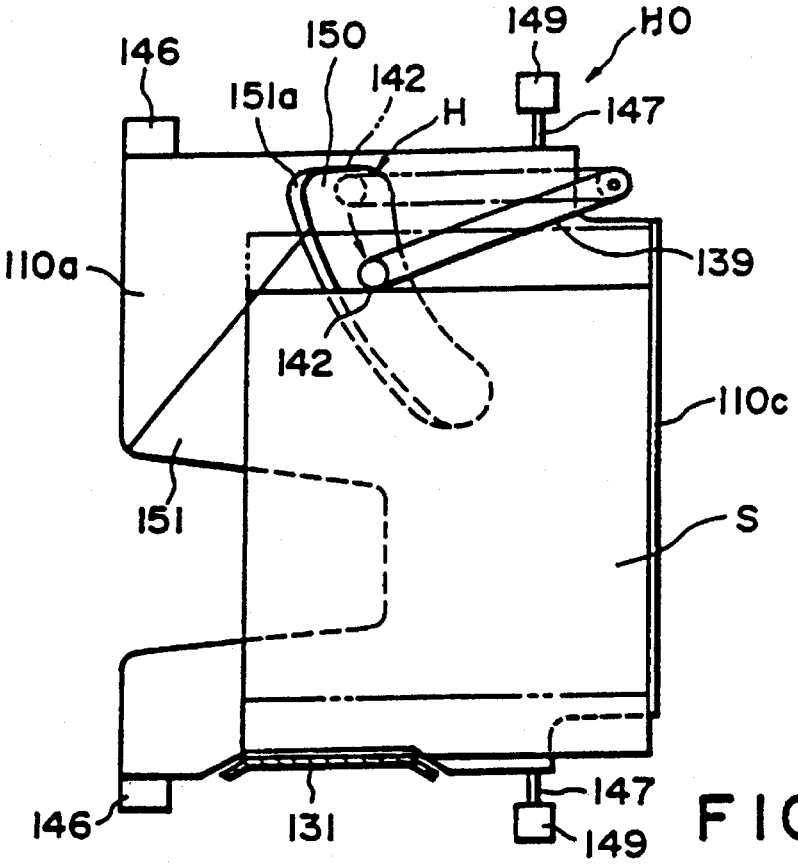
FIG. 20 is a top plan view of the bin illustrating sheet aligning operation.

If a non-sorting mode in which the sheets S are not to be sorted, is selected in an unshown operating panel, the flapper 107 is switched by an unshown solenoid to guide the sheet S to a passage 105, by which the sheet S comes from the inlet roller couple 103 to the passage 105. The sheet S is discharged to the topmost bin 110 by the discharging roller couple 108 through the passage 105. At this time, the leading edge of the sheet S passes above the elongated slot 150, but the leading edge of the sheet S is not obstructed by the elongated slot 150 because it is guided by the taper 151a (FIG. 17). The sheet S discharged on the bin 110 slides on the bin 151 to abut the base perpendicular portion 110c by the inclination of the bin. However, the sheet S is still away from the alignment reference plate 131, as shown by chain lines in FIG. 20. Then, the pulse motor 135 rotates through a rotational angle determined in accordance with information from the image forming apparatus indicative of the sheet size, by which the gear 136 is rotated. The rotation of the gear 136 rotates the sector gear 133, so that the upper and the lower arms 137 and 139 rotate together with the sector gear 133. By this, the alignment rod 142 extending between the ends of the upper and lower arms 137 and 139 moves from the home position H in the direction indicated by an arrow in the elongated slot 150, thus moving the sheet S from the chain line position to the solid line position, whereby the sheet S is abutted to and aligned with the alignment reference plate (FIG. 20).

After a predetermined period of time, the pulse motor 135 is reversed to return the alignment rod 142 to the home position H, upon which the light blocking plate 143 interrupts an optical path between a light emitting portion and a light receiving portion of the home position sensor 145 to actuate the sensor 145, and the pulse motor 135 stops to terminate the alignment operation. Alternatively, the alignment rod 142 is not returned as far as the home position H, but it is moved back to a waiting position where it does not interfere with the discharge of the sheet S, and is then moved to the position for aligning the next sheet, and then is returned to the waiting position. When the second sheet S is discharged from the image forming apparatus, the sheet S is aligned and accommodated on the topmost bin 110, similarly to the operation described above, and the similar operation is repeated until a preset number of the sheets S are accommodated on the topmost bin 110.

When a sorting mode for sorting the sheets S is selected in the operation panel not shown, the sheet S discharged from the image forming apparatus is introduced into the main assembly 112 by the inlet rollers 103 at the sheet inlet 102, and is guided to the passage 106 by the flapper 107 which has been switched properly by an unshown solenoid in response to the selection of the sorting mode. The sheet S is discharged to the topmost bin 110 of the bin unit 111 by the discharging roller couple 109, the bin unit 111 having been moved to the lower position. Similarly to the operation described above, the alignment rod 142 swings to align the sheet S to the alignment reference plate 131. When the second sheet S is subjected to the image forming operation, a start signal is produced, in response to which the driving motor 117 rotates through a predetermined amount. The rotation of the motor 117 is transmitted to the rotational shaft 122 through the chain 125, by which the lead cam 121 rotates one full turn. By this, the topmost bin 110, disposed at a sheet receiving position C for receiving the sheet S discharged by the discharging roller couple 109, is moved to a position B by the roller 149 thereof moves upwardly along the groove 121a of the lead cam 121, and the second bin 110 disposed at the position D is moved up to the sheet receiving position C (FIG. 18). In this manner, all the bins 110 move upwardly stage by stage, and simultaneously, the bin unit 111 itself moves vertically through a distance corresponding to the interval between adjacent bins for each time. When the second sheet S is discharged after being subjected to the image forming operation by the image forming apparatus, it is accommodated on the second bin 110 now placed at the receiving position C by the above-described operation. In this manner, for each of the starts of the image forming operations to the sheets S, the bins 110 move upwardly step-by-step to sort and accommodate the sheets S.

Figure 21:
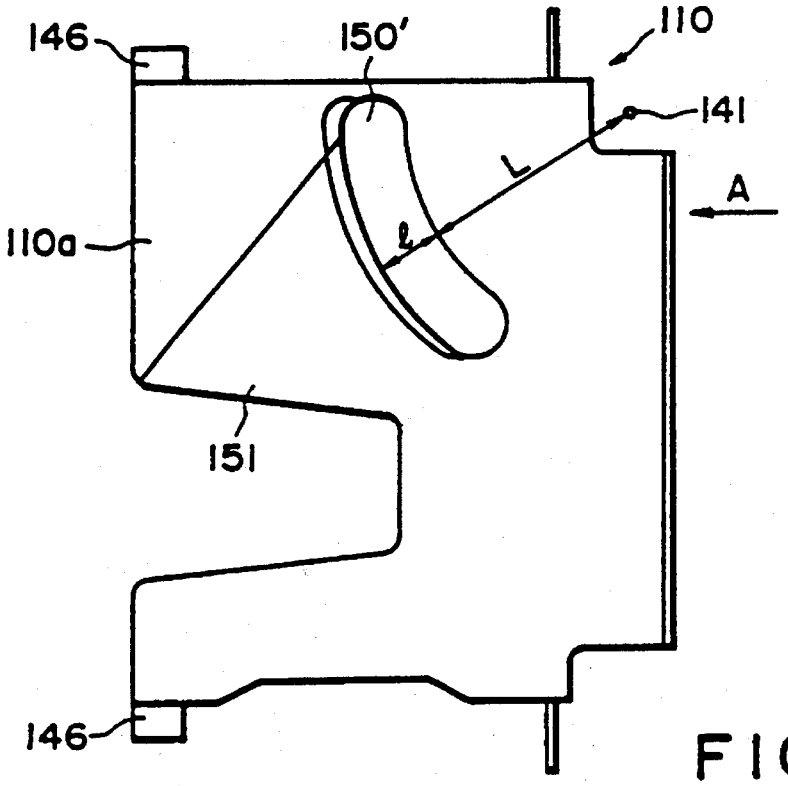
FIGS. 21–24 are top plan views of bins illustrating examples of a slot therein.

In the foregoing embodiment, the elongated slot 150 is formed at a predetermined distance (L) away from the shaft 141 (radius L) with a minimum width 1. Alternatively, as shown in FIG. 21, the slots 150' may be formed by circumferences having a radius L and (L+1) about a shaft 141.

Figure 22:
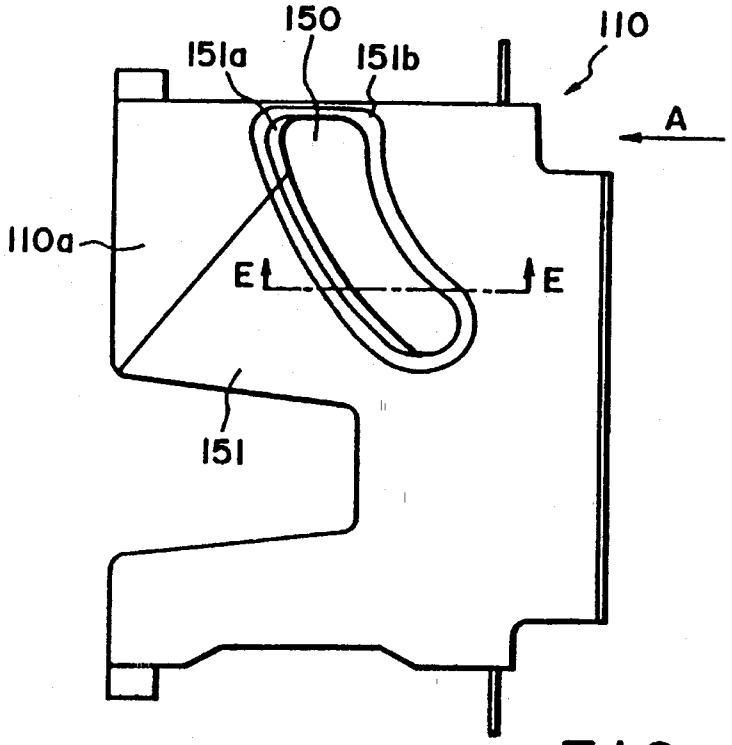
Figure 23:
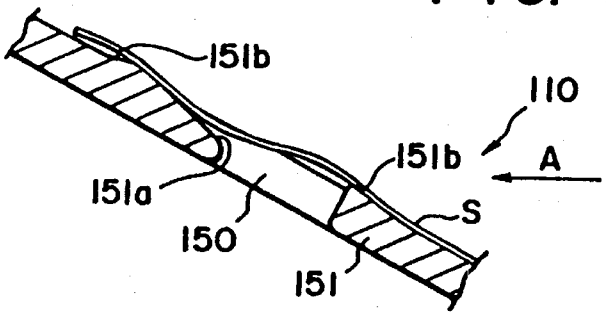

As shown in FIGS. 22 and 23, the portion around the periphery of the elongated slot 150 of the bin 151 may be made thicker with smooth inclination to form a thick portion 151b. By this, the bin 151 is reinforced, and the sheet S discharged onto the bin is guided upwardly by the thick portion 151b to prevent the sheet S from being obstructed by the elongated slot 150.

Figure 24:
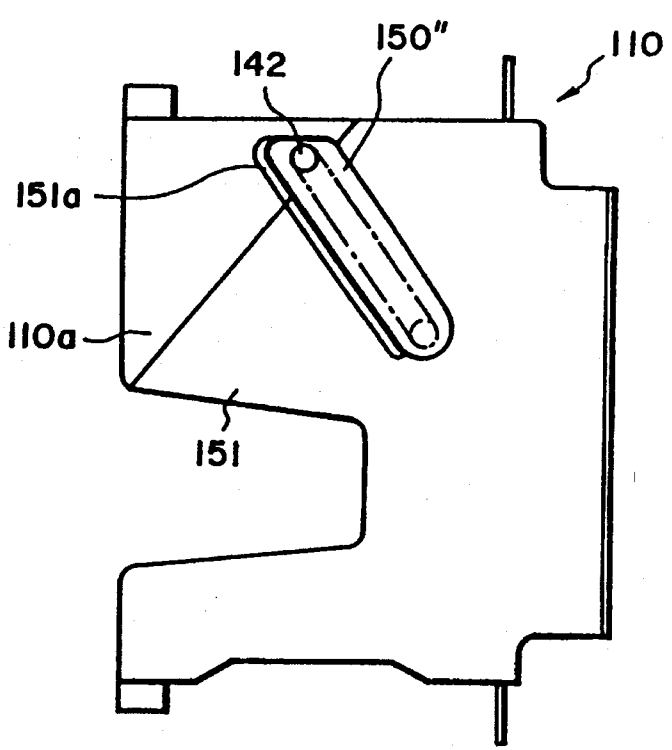

In the foregoing embodiment, the alignment rod 142 is rotated, but as shown in FIG. 24, it may be made movable along a rectilinear line. In that case, the elongated slot 150" is extended straight, by which the contact portion between the elongated slot 150" and the sheet S is reduced, therefore, the obstruction by the slot 150" to the sheet movement S is further prevented.

As described, according to this embodiment, the bin is provided with the elongated slot for allowing penetration of alignment member, so that the alignment member moves through the slot to perform the sheet aligning operation, by which the necessity of the provision of an open slot for allowing insertion of the alignment member is eliminated, so that the strength of the bin can be assured. In addition, the possibility that the sheet is obstructed by the slot resulting in inability of the alignment can be reduced.

Also, since only one corner portion 110a at the downstream free end side of the bin with respect to the sheet discharging direction where the alignment member 142, 150 is located, is inclined with respect to the sheet supporting surface 110b, the sheet aligning operation by the aligning member 142 can be performed without obstruction. More particularly, even if there is a cut-away portion 151b for allowing small size sheets to be taken out, the inclined surface 110a is effective to keep the sheets with a certain degree of rigidity when large size sheets are supported on the sheet supporting surface 110b to prevent the sheets from being flexed; and despite the fact, the inclined portion is not formed at the alignment reference plate 131 side.

By providing tapered surface 151a at the downstream side of the elongated slot 150 with respect to the sheet discharging direction, the sheet is prevented from being obstructed by the elongated slot 150 when it is being discharged, so that the sheet can be assuredly received on the bin 151.

By forming a thick portion 151b around the periphery of the elongated slot 150, the strength of the bin about the elongated slot 150 can be increased.

Referring to FIGS. 25–30, the stapler will be described in detail.

Figure 25:
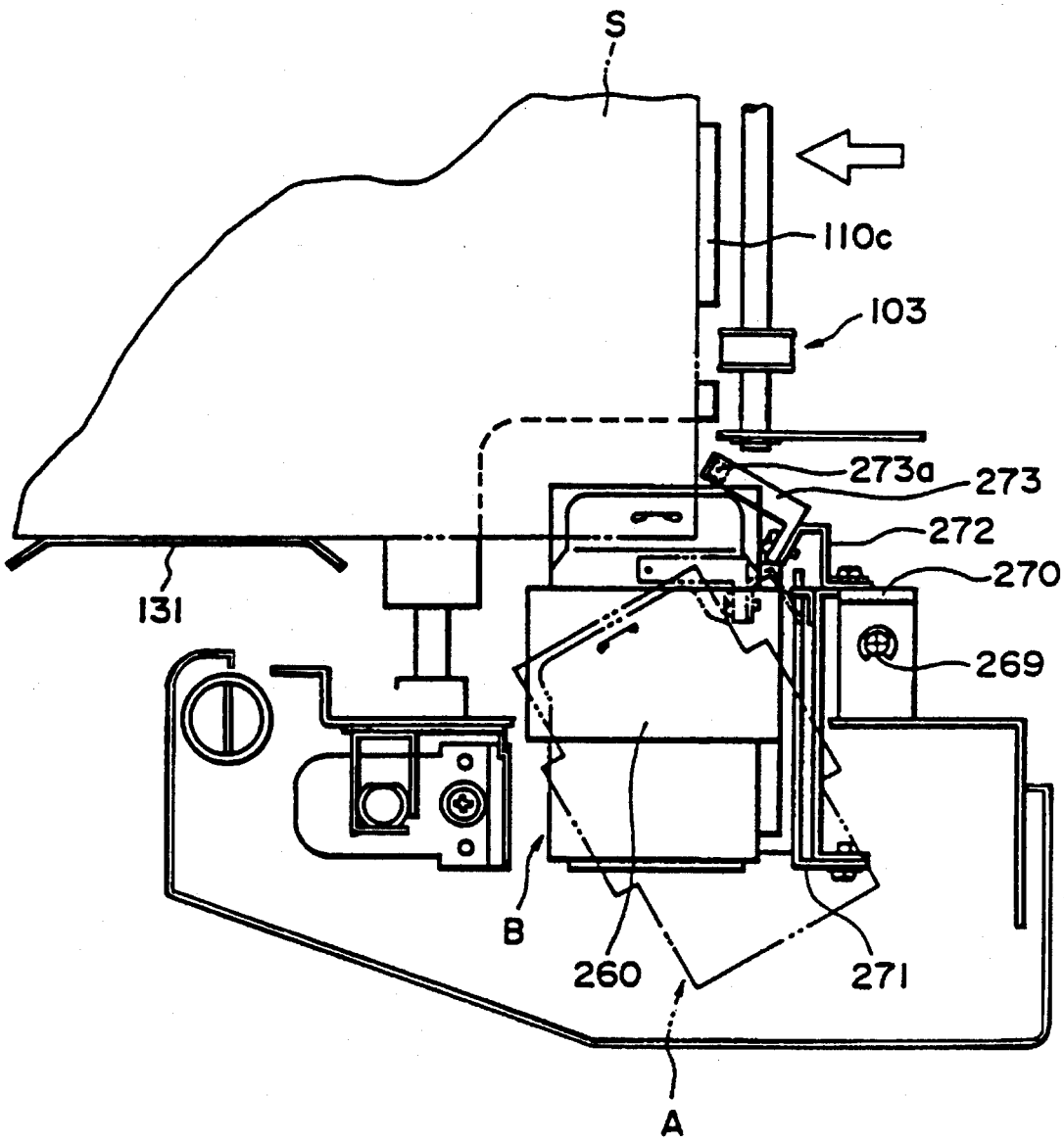
FIG. 25 is a top plan view of a part of a post-processor according to a further embodiment of the present invention wherein a sheet detecting means is illustrated.
Figure 26:
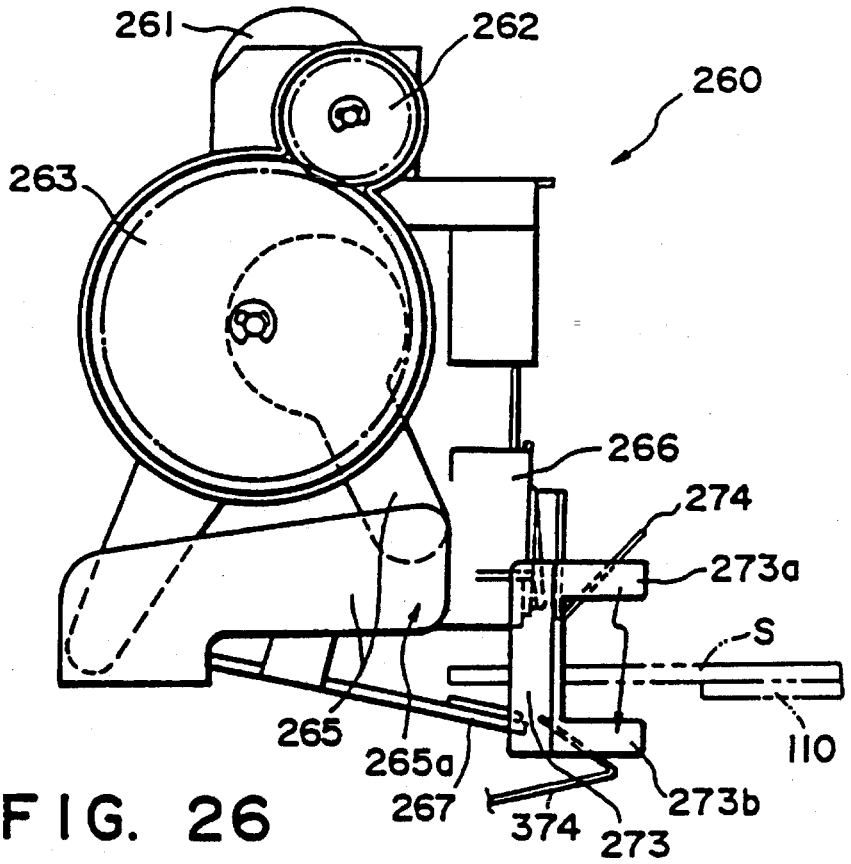
FIG. 26 is a side view of the apparatus of FIG. 25.
Figure 27:
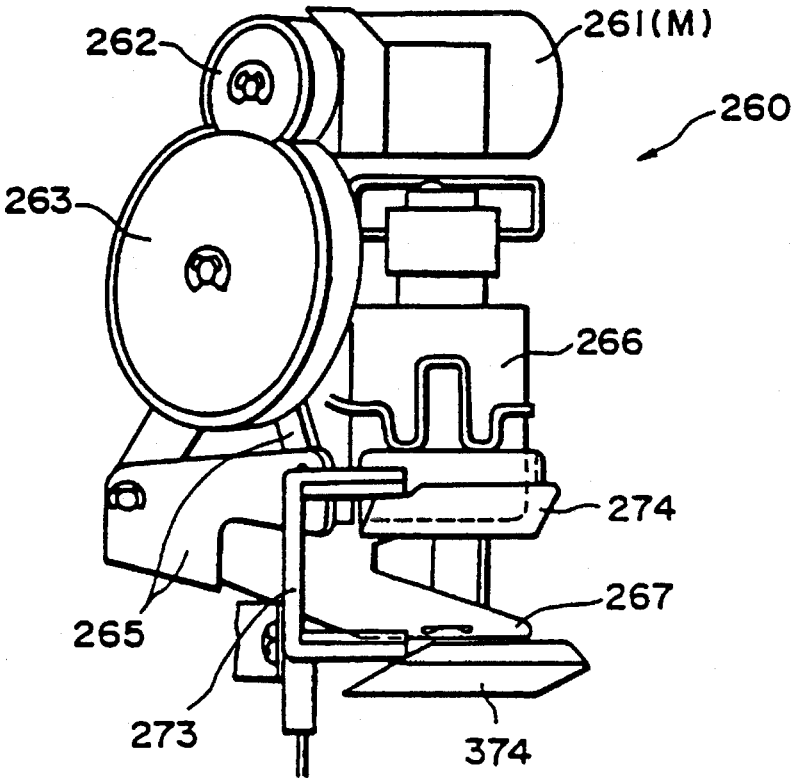
FIG. 27 is a perspective view of the apparatus of FIG. 25.
Figure 28:
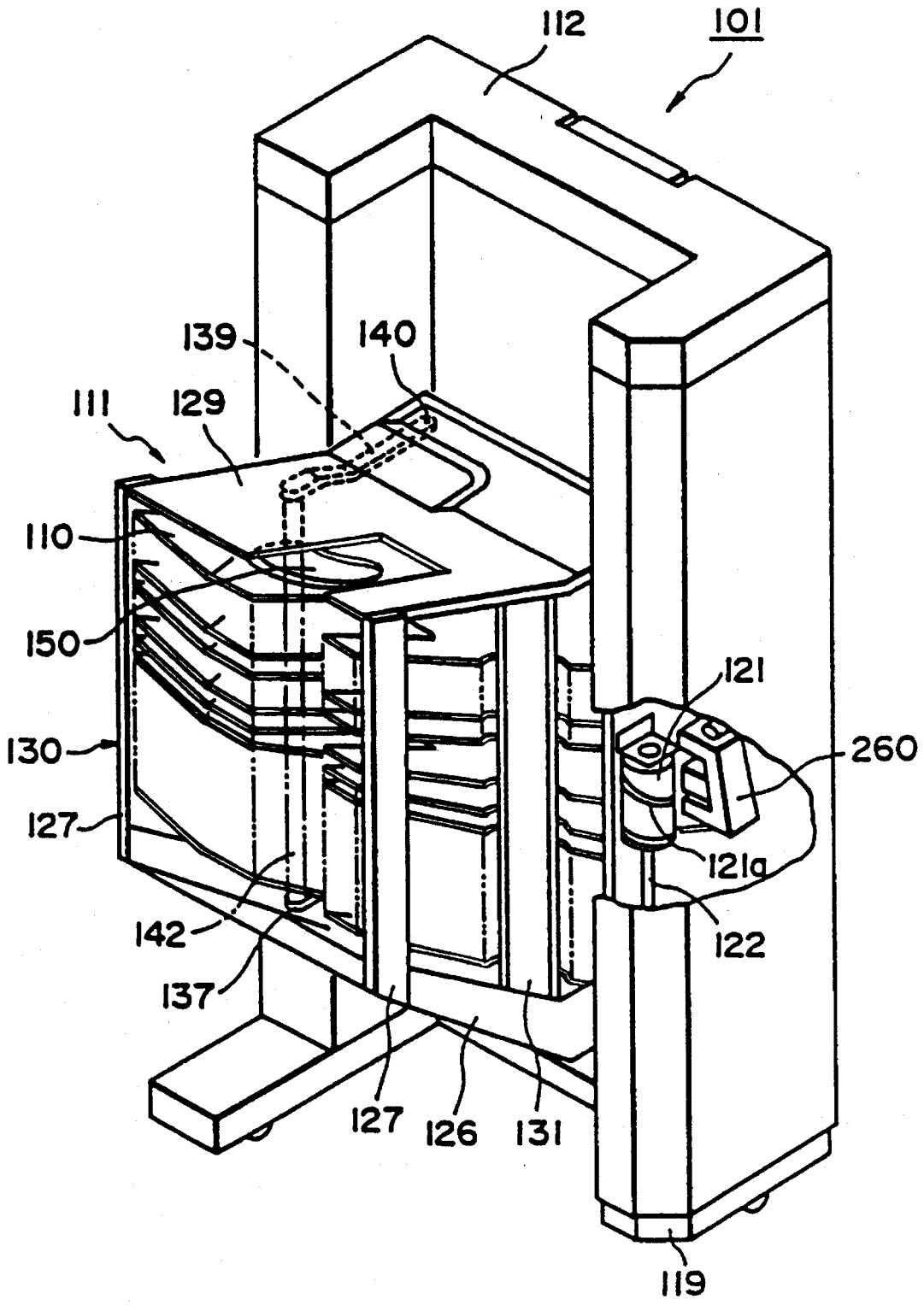
FIG. 28 is a perspective view of post-processor provided with a stapler shown in FIGS. 25–27.
Figure 29:
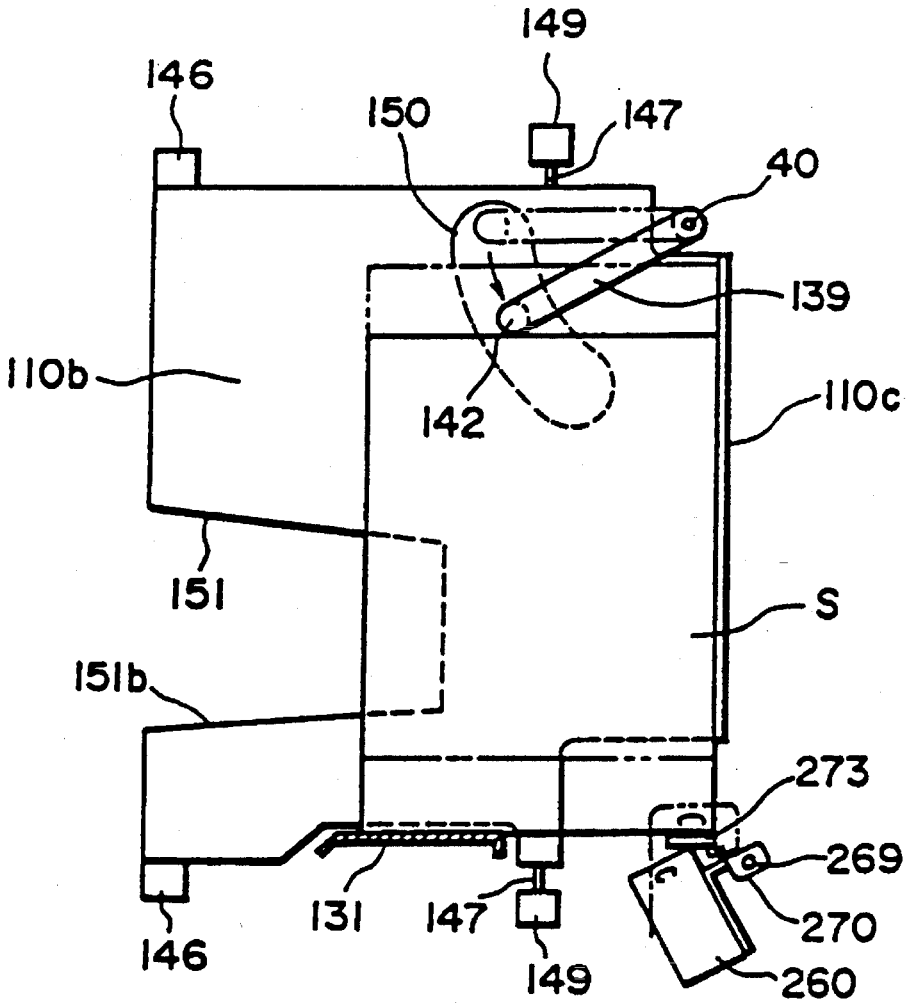
FIG. 29 is a top plan view of the apparatus according to the embodiment of the present invention.

As shown in FIGS. 25, 26 and 27, the stapler 260 includes a driving motor 261, a gear 262 fixed to an output shaft of the motor 261, wherein a gear 263 is meshed with the gear 262. The gear 263 is connected with a link 265 having an end mounted to the frame of the apparatus. At an articulation 265a of the link 265, a stapling head 266 is disposed. Below the stapling head 266, an anvil 267 is disposed. The stapler 260 is fixedly mounted on a stapler base 261 fixed on a swingable base 270 which is swingable about a shaft 269, so that it is movable swingingly together with the swingable base 270. The swingable base 270 is provided through the mounting base 272 with a sheet detecting sensor 273 for detecting the presence or absence of the sheet adjacent a front and right corner of the stapler 260. The sensor block 273 comprises a light emitting portion 273a and a light receiving portion 273b and is in the form of a channel.

In operation, the swingable base 270 is rotated by an unshown motor to move the stapler 260 from a normal retracted position A to the stapling position B by the rotation about the shaft 269. During this motion, the [trailking] *trailing* and front corner of the sheet S on the bin 110 relatively passes across the space between the light emitting portion 273a and the light receiving portion 273b of the sheet sensor 273 which swings together with the swinging motion of the swingable base 270, by which the sheet S is detected by the sensor block 273. If the sheets S on the bin 110 have been [advertently] *inadvertently* taken out so that the sensor block 273 does not detect any sheet, the microcomputer 261 prevents the stapling action by the stapler 260 and returns it to the retracted position A. When the microcomputer receives a signal indicative of the presence of the sheet S by the sensor block 273, it drives the motor 261 to allow the stapler 260 to staple the sheets S on the bin 110. After the stapling action, the stapler 260 is returned to its retracted position A. The microcomputer rotates the lead cam 121 by the driving motor 117 to lift the bins through one stage, and after the sheet sensor block 273 detects the presence of the sheet S accommodated on the second bin 110, the stapler 260 now disposed for the second bin performs the stapling action. By similar operations, the bins 110 are lifted step by step, and sets of the sheets S on the bins 110 are sequentially detected by the sheet sensor block 273, and are stapled. When all of the sets of the sheets S on the bin 110 are stapled, the stapling operation is stopped.

In the foregoing embodiment, the stapling operation was performed after completion of the sorting and accommodation of the sheets S, but it is a possible alternative that a set of sheets S is stapled each time the final sheet S is discharged on the bin 110.

Figure 30A:
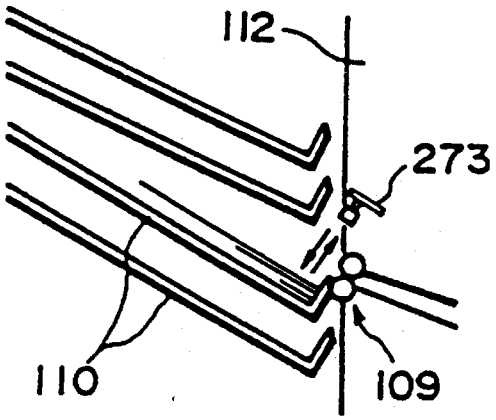
FIGS. 30A and 30B are front views illustrating other examples of the sheet detecting means.
Figure 30B:
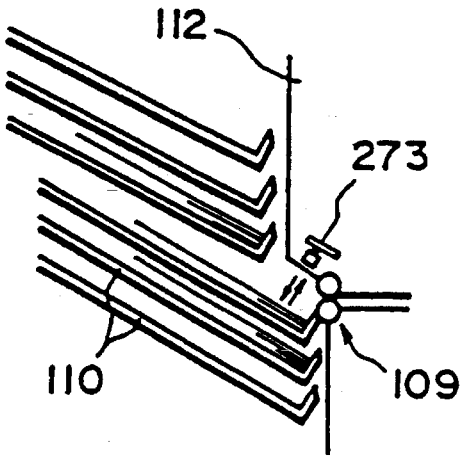

In the foregoing embodiment, a transparent type sensor movable together with the stapler 260 is used for the sheet detecting sensor block 273, but it is a possible alternative that a reflecting type sensor fixedly mounted to the frame 212 may be used, as shown in FIG. 30A. If this is used, mounting of the sensor 273 is easy if the sorter 1 is of the type wherein the bins 110 are movable horizontally (sheet discharging direction), as shown in FIG. 30B.

In the foregoing embodiment, the sheet sensor 273 is movable integrally with the stapler 260, but the sensor 273 may be independently rotatable.

In the foregoing embodiment, the sheet sensor block 273 is mounted to the swingable base 270 through the mounting base 272, but the light emitting portion 273a and the light receiving portion 273b of the sheet sensor 273 may be mounted to the head 266 and the anvil 267 of the stapler, respectively.

As described in the foregoing, according to this embodiment, there is provided detecting means for detecting the sheets accommodated on the bin on which the stapler acts, and the stapling operation is allowed only when the detecting means detects the sheet on the bin, and therefore, the stapler is prevented from performing the stapling action without sheets, which can result in jam of staples.

By mounting the detecting means on the stapling device, it is possible to detect the presence or absence of the sheets to be stapled during the stapler moving to the stapling position, whereby particular time is not required for the detection. Therefore, the post processing operation can be speedily and efficiently performed.

Referring to FIGS. 31–35, another embodiment will be described by which the sheets which have been curled at their leading edges can suitably be stapled.

Figure 31:
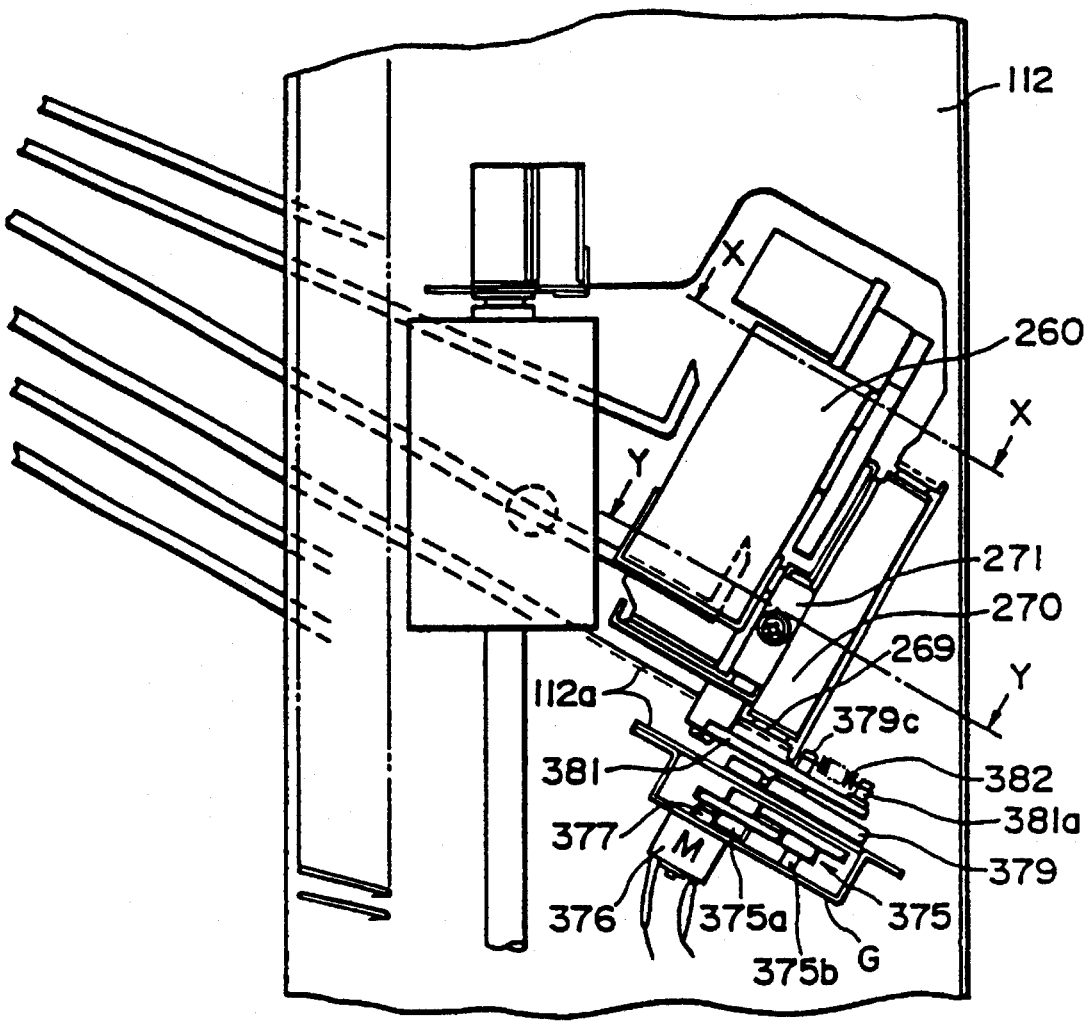
FIG. 31 is a front view of a post processor particularly illustrating details of a mechanism for moving the stapler.
Figure 32:
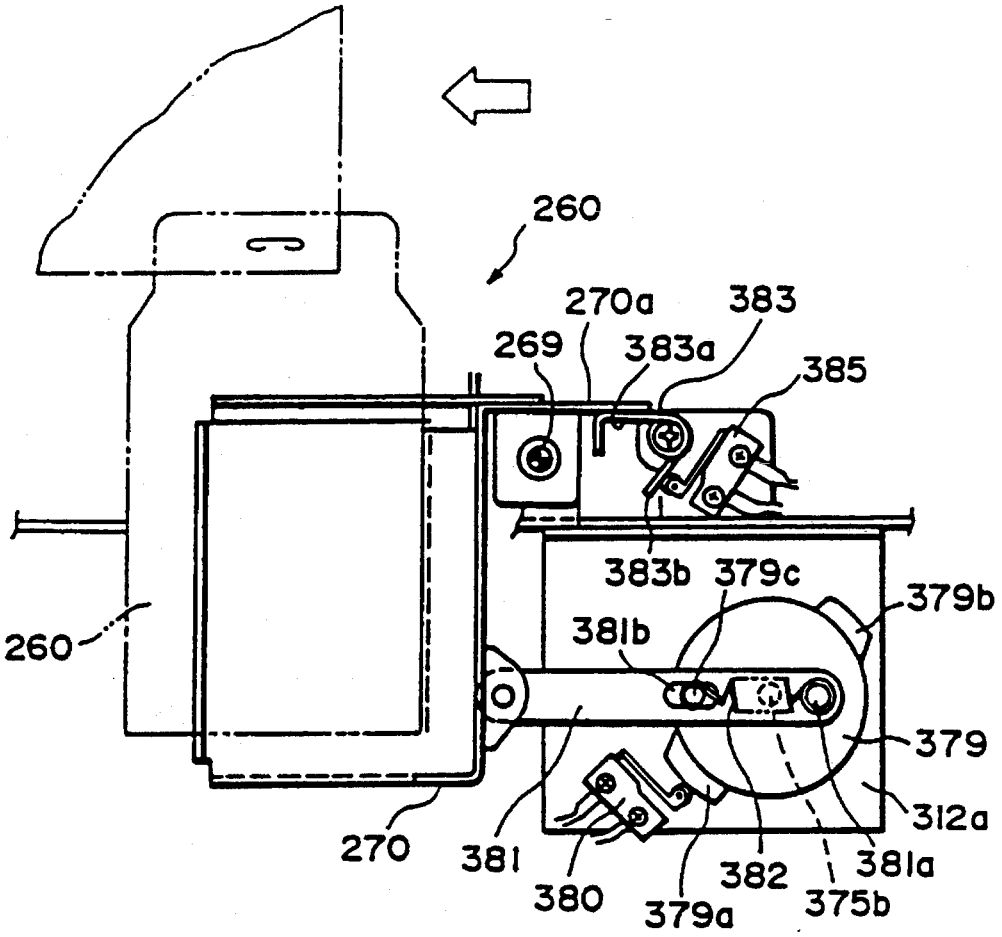
FIG. 32 is a sectional view taken along a line Y—Y of FIG. 31.

As shown in FIGS. 31 and 32, the frame 112a has a shaft 269 mounted thereon, on which a swingable base 270 is rotatably supported. The swingable base 270 has a stapler base 271 fixedly mounted thereto. The stapler base 271 carried a stapler 260. To the frame 112a, a gear box G containing reduction gears 375 is mounted, and to the gear box G a motor 376 is mounted. The motor 376 has an output shaft to which a gear 377 is fixedly mounted. The gear 377 is meshed with an input gear 375a of the gear train 375. The gear train 375 has an output shaft 375b to which a link disk 379 is mounted. To the outer periphery of the link disk 379, cams 379a and 379b are disposed, and they serve to actuate or deactuate a microswitch 380 which is mounted on the frame 112a to energize the motor 376. Adjacent the outer periphery of the disk 379, a shaft 379c is mounted. To the swingable base 270, a link arm 381 is connected for rotation in a horizontal plane. The link arm 381 is provided with a shaft [381] *381a* and has an elongated slot 381b. Through the slot 381b, the shaft 379c is penetrated, and a spring 382 is stretched between the shaft 379c and the shaft 381a. In the neighborhood of the shaft 269, a bell crank arm 383 made of resin material or the like is rotatably supported. An end 383a of the arm 383 is contacted to an end 270a of the swingable base 270, and the other end 383b is contactable to a microswitch 385 for detecting the stapler being displaced at its stapling position. To the swingable base 270, a sheet sensor block 273 for detecting the presence or absence of the sheet is mounted through a mounting base 272 (FIG. 25). The sensor block 273 comprises a transparent type sensor having a channel shape and comprising a light emitting portion 273a and a light receiving portion 273b.

In operation, when a preset numbers of stacks of the sheets S, after being printed, are sorted and accommodated on the respective bins 110, the microcomputer drives the driving motor 117 to rotate the lead cam 121 to place the topmost bin 110 to the stapling position, that is, the position for receiving a sheet S discharged by the discharging roller couple 109. Then, the computer instructs the motor 376 to rotate, and the rotation of the motor 376 is reduced by the gear train 375 and is transmitted to the output shaft 375b. By this, the link disk 379 rotates in the clockwise direction. When the stapler 260 is at its retracted position A (FIG. 25), the cam portion 379b is in contact with the microswitch 380 to close it. However, by the clockwise rotation of the disk 379, the cam portion 379b is brought out of contact with the switch 380 to open it. Further, the clockwise rotation of the link disk 379 is transmitted to the link arm 381 from the shaft 379c to the spring 382 and the shaft 381a. Then, the arm 381 swings about a shaft 379c inserted in the slot 381b in the leftward direction (FIG. 32). By the movement of the link arm 381, the swingable base 270 swings about the shaft 269. When the link disk 379 further rotates, the cam portion 379a is brought into contact with the microswitch 380 to close it. The microcomputer receives the on-signal from the switch 380 and deenergizes the motor 376 to stop the link disk 379. At this time, the swingable base 270 is at a position shown in FIG. 32. An end 270a of the base 270 (FIG. 32) pushes an end 383a of the arm 383 to rotate the arm 383 in the counter-clockwise direction. By this, the other end 383b of the arm 383 presses the microswitch 385 to actuate the switch 385. The microcomputer receives the on-signal of the switch 385 to detect the stapler 260 having moved to the stapling position B (FIG. 32). Ben the stapler 260 moves from the retracted position A to the stapling position B, the sheets S accommodated on the bin 110, are guided by upper and lower guides 274 and 374 into the space between the head 266 of the stapler 260 and the anvil 267.

If the sheet S on the bin 110 is curled, the curl of the sheet S is confined by the upper and lower guides 274 and 374, and the sheet is guided into the space between the head 266 and the anvil 267. During this, the set of sheets S is detected by the sensor block 273 by the trailing end front corner of the sheets S on the bin 110 passing through the space between the light emitting portion 273 and the light receiving portion 273b of the sheet sensor block 273 which integrally moving with the swingable base 270. If the sensor block 273 does not detect the sheets S for the reason, for example, that the sheets S have been inadvertently taken out from the bin 110 by the operator, the microcomputer does not allow the stapler 260 to operate but causes it to be returned to the retracted position A. When the microcomputer 261 receives the signal indicative of the presence of the sheet S by the sensor block 273, it instructs to drive the driving motor 361 to make the stapler 260 staple the sheets S on the bin 110. After the stapling operation, the stapler 260 is returned to the retracted position A.

Figure 33A:
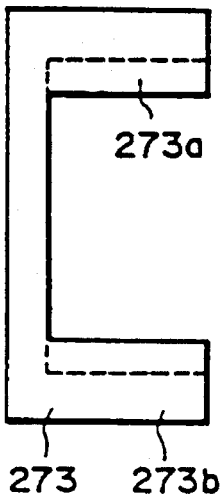
FIGS. 33A, 33B, 34 and 35 illustrate other examples of a mechanism for confining curling of the sheet.
Figure 33B:
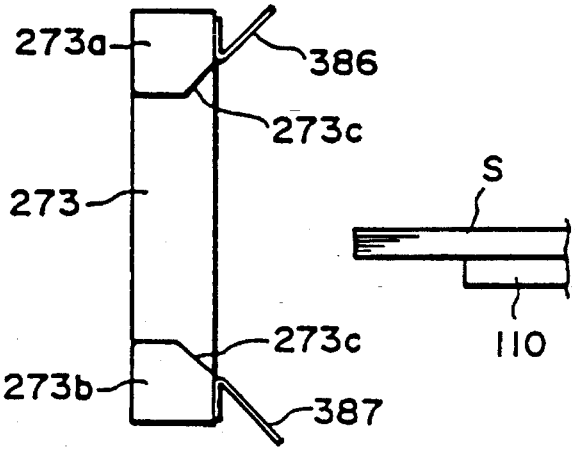

In the foregoing embodiment, the sheet sensor block 273 is in the form of a channel and has generally a rectangular cross section. It is a possible alternative that, as shown in FIGS. 33A and 33B, a tapered surface 273c is formed, wherein an upper guide 386 is provided on the same surface as the afore-mentioned upper guide 374, and a lower guide 387 is provided on the same surface as the aforementioned lower guide 374. By this, when the sheet accommodated on the bin 110 is curled, the curl can be confined by the upper and lower guide 386 and 387 to prevent the sheet detecting sensor 273 from contacting the curled sheet S and folding it. By making the distance between the light emitting portion 273 and the light receiving portion 273b of the sensor block 273 sufficiently larger than the distance between the upper and lower guide 274 and 374, the sensor block 273 can be effectively prevented from contacting the sheet S.

Figure 34:
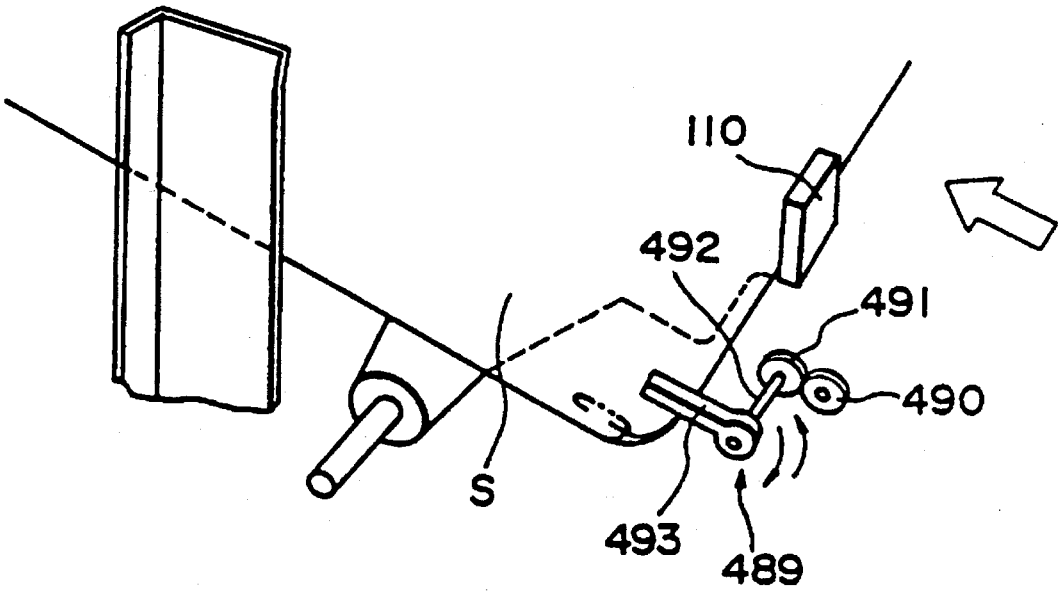

In the foregoing embodiment, the description has been made as to the case where the upper and lower guides 274 and 374 are employed as a means for confining the curled sheet. However, it is a possible alternative that, as shown in FIG. 34, a curled sheet confining member 489 is employed which is insertable and retractable with respect to the bin unit.

The curled sheet confining member 489 includes a gear 490 connected to an unshown motor, a gear 491 meshed with the gear 490 and a curled sheet confining rod 493 fixed to a shaft 492 of the gear 491. The rod 493 swings to confine the curled sheet.

Figure 35:
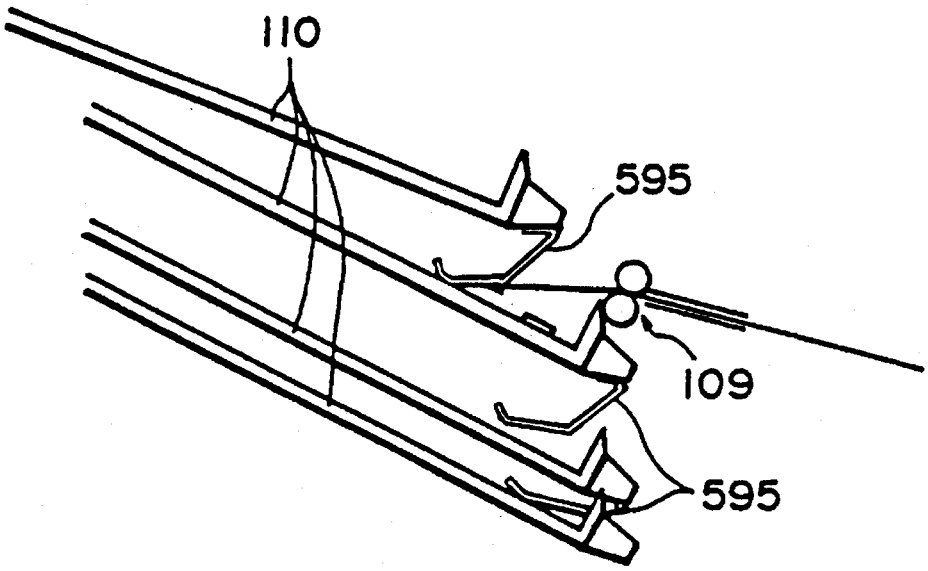

In this embodiment, the upper and lower guides 274 and 374 are used for confining the curled sheet. It is a possible alternative that, as shown in FIG. 35, a sheet confining spring 595 constituted by a leaf spring or the like is provided at a base side of each of the bins 110. The curled sheet is confined by the confining spring 595 mounted to the adjacent upper bin 110.

As described in the foregoing, according to this embodiment, there is provided a curl confining means to confine the curled sheet which is going to be stapled by the stapler, by which the sheet is prevented from being contacted by the stapler and being folded or being disturbed, which can result in improper stapling.

Referring to FIGS. 36, 37, 38, 39 and 40, a mechanism for positioning the stapling device will be described.

At the front side of the sorter 101, there is provided an automatic (electric) stapler 755 for stapling the sheets accommodated in each of the bins B, facing a lower couple of discharging rollers 109. The automatic stapler 755 includes a solenoid 756 and a stapling spring 757.

The solenoid 756 has a link 756a to which a link pin 771 is fixedly mounted, and a solenoid spring 773 is stretched between the link pin 771 and a stapler pin 772 of the automatic stapler 755. The link 756a is engaged with the stapler pin 772 through a slot formed in an end portion of the link 756a. To the automatic stapler 755, a stapling position stopper 776 is fixedly mounted, and the stapler 755 is normally placed outside the path for the sheet (solid line position) by being contacted to the stopper [706] *760* by the function of the stapler spring 757.

When the sheets S on the bin B are stapled, the solenoid 756 is operated to move the stapler to the position shown by chain lines where the stapling position stopper 776 is abutted to a sheet alignment reference 719c of the bin frame 719. Then, the sheets S accommodated in the bin B opposed to the lower couple of the discharging rollers 109.

Figure 36:
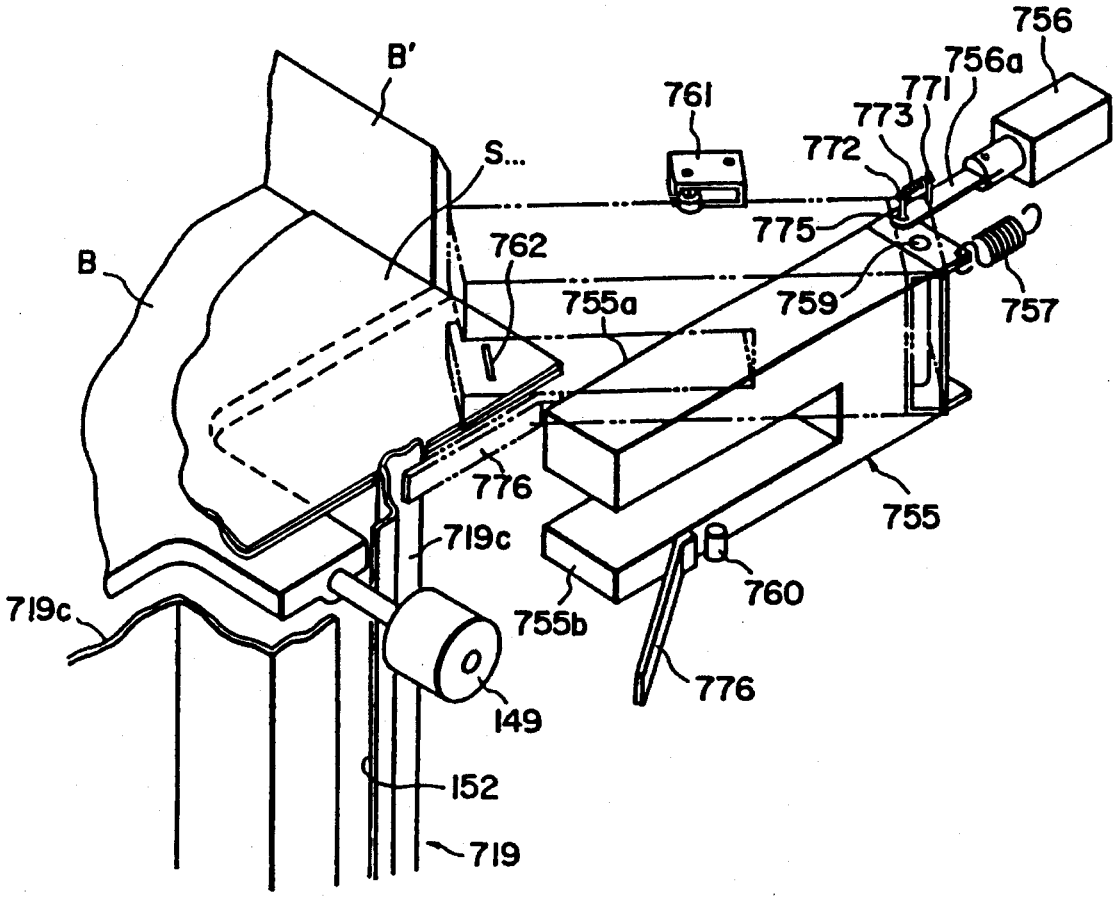
FIG. 36 is a perspective view of an apparatus according to an embodiment of the present invention wherein a reference for positioning the sheet and an automatic stapler.

In FIG. 36, indicated by a reference numeral 761 is a microswitch to detect the stapler 755 placed at the stapling position to produce a detection signal.

When a stapling mode is selected, the solenoid 756 is actuated in response to a stapling start signal.

The automatic stapler 755 rotatingly moves about a pivot 759 by the solenoid 756 and is moved to its stapling position so that the stapling position stopper 776 is abutted to the sheet alignment reference position 719c, by which the stapler 755 is correctly positioned.

Figure 37:
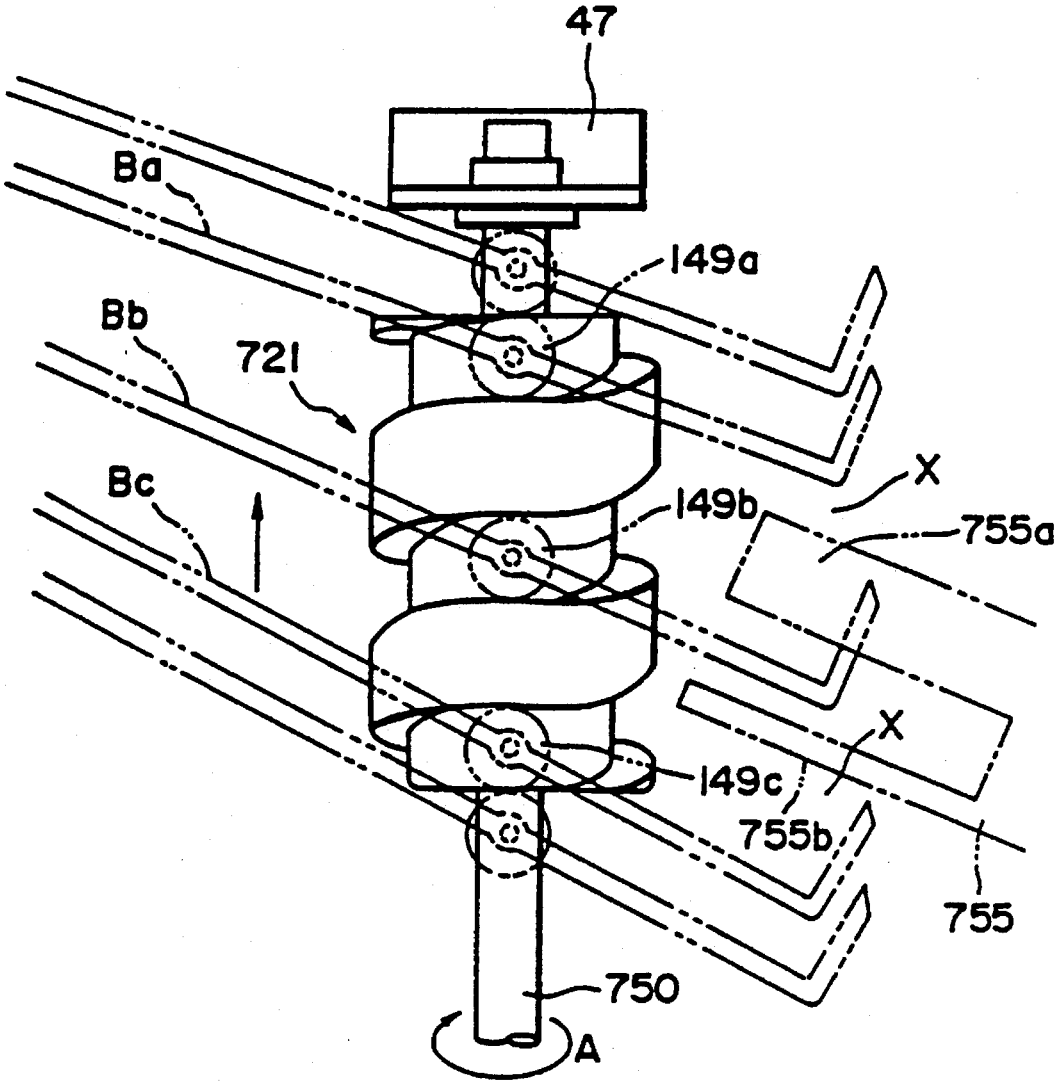
FIG. 37 is a side view of a lead cam opening the space between adjacent bins.
Figure 38:
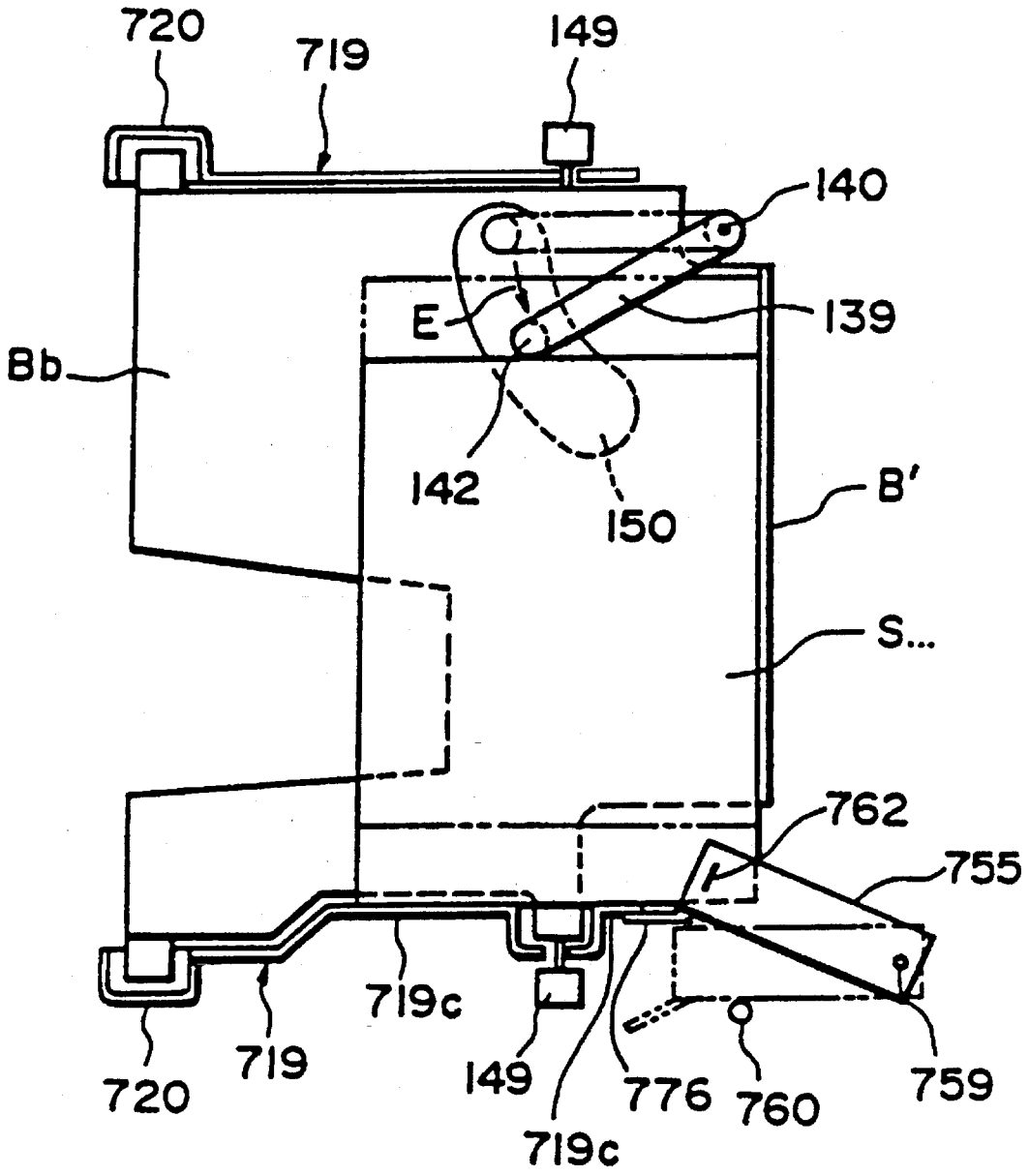
FIG. 38 is a plan view of the apparatus illustrating sheet alignment and stapler positioning.

At this time, the head portion 755a of the stapler 755, as shown in FIG. 37, for example, moves to the stapling position through an upper opening portion X formed between the bin Bb accommodating the sheets to be stapled and the adjacent upper bin Ba, and the anvil portion 755b is moved to the stapling position through a lower opening X, that is the opening formed between the bin Bb and the adjacent lower bin.

As shown in FIG. 36, when the automatic stapler 755 is positioned at the stapling position, the microswitch 761 is actuated, so that a stapling permitting signal is produced, in response to which the stapler 755 is driven, by which the sheets S are stapled by staple 762.

After completion of the stapling operation, solenoid 756 is deactuated, and the stapler 755 is returned by the function of the stapler spring 757 to be contacted to the stopper 760. Thus, the stapling operation for one bin terminates.

When the stapling operations are carried out for plural bins B, it is most efficient if the stapling operation starts from the last bin B to which a sheet is lastly discharged. To do this, after the series of the stapler 755 operation in response to a signal indicative of completion of the bin shiftings, the bin is shifted in response to a signal indicative of completion of the series of the stapler 755 operations; and these are repeated until the stapling operation is effected for each of the bins. The number of the bin shifts for the automatic stapling, corresponds to the number of bin shifts at the time of the sorting operation.

Figure 39:
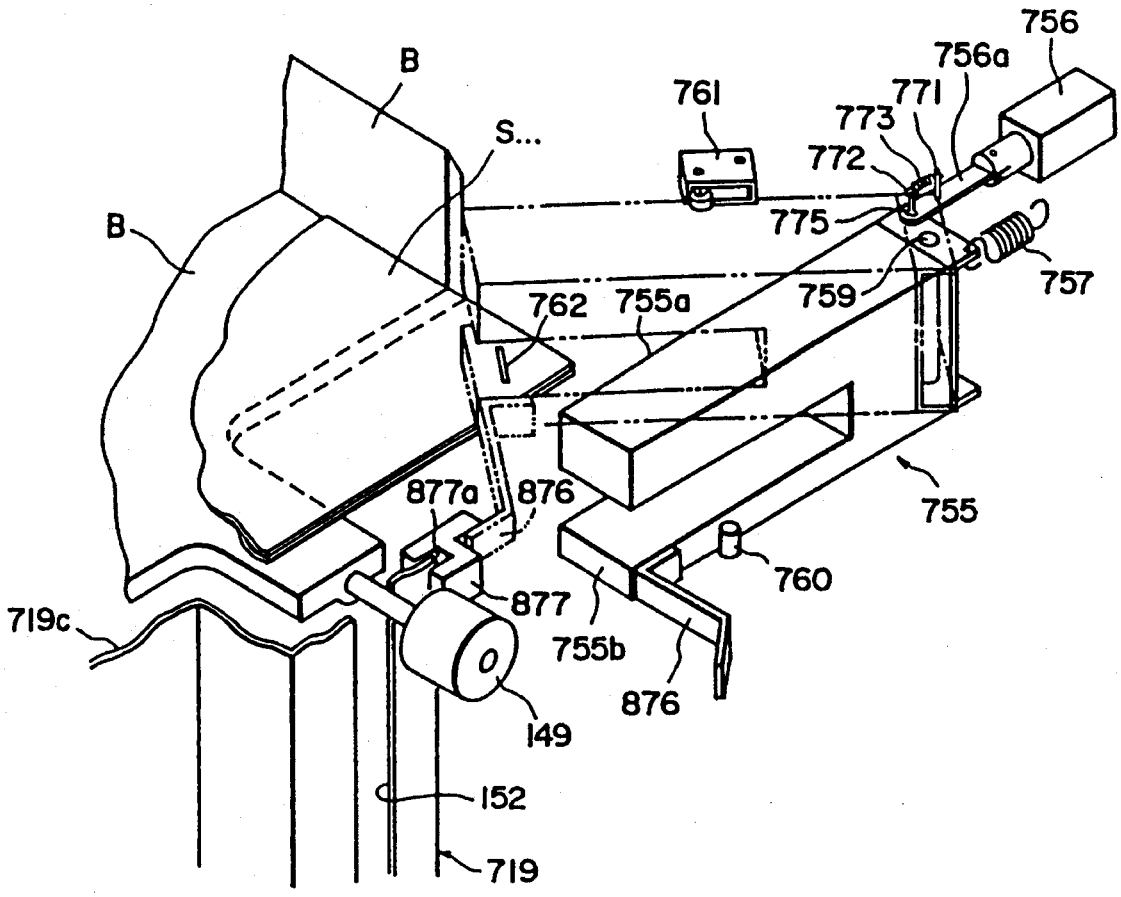
FIG. 39 is a perspective view of the apparatus illustrating a frame guide and an automatic stapler.
Figure 40:
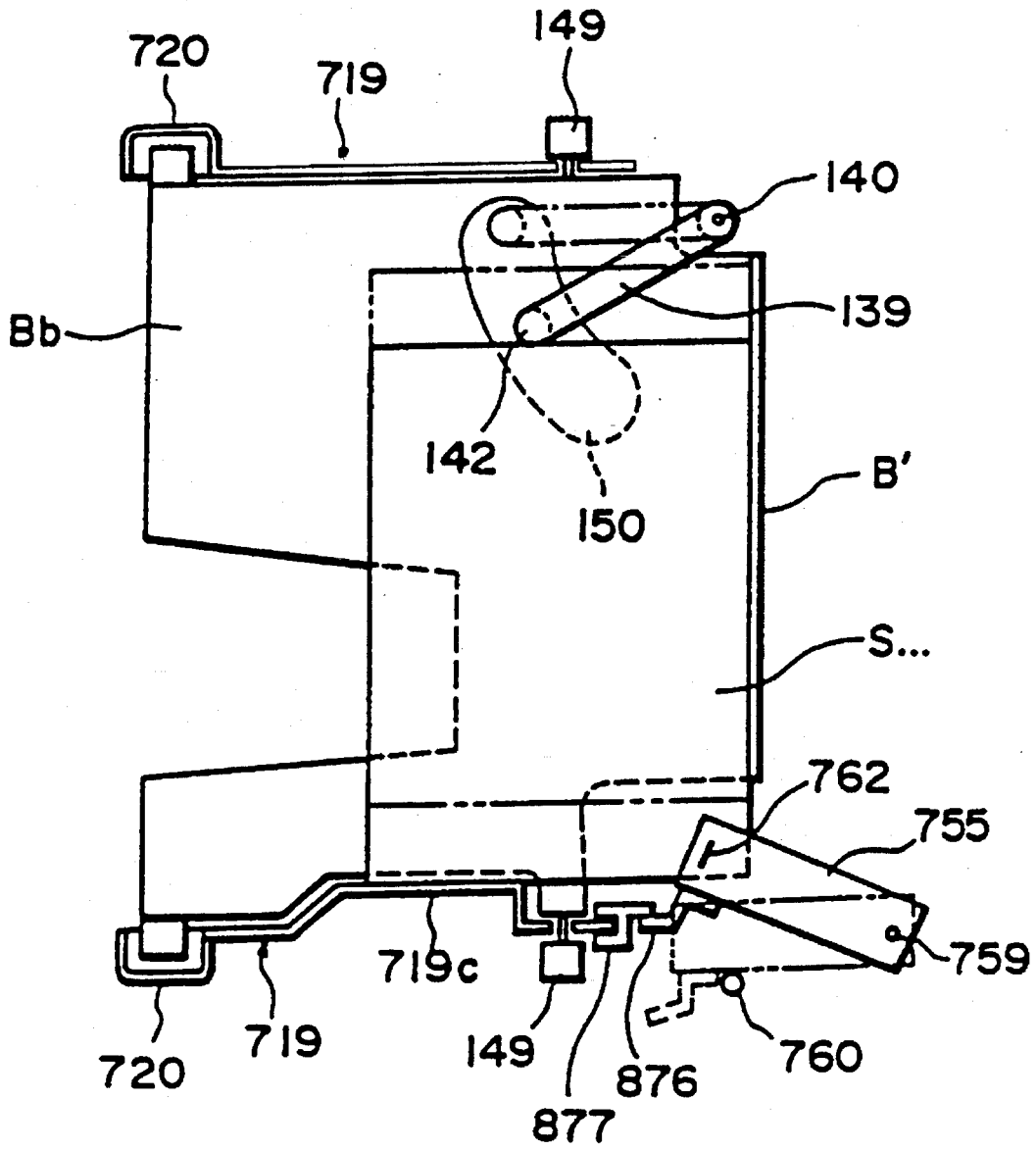
FIG. 40 is a plan view illustrating sheet alignment and stapler positioning in the apparatus of FIG. 39.
Figure 41:
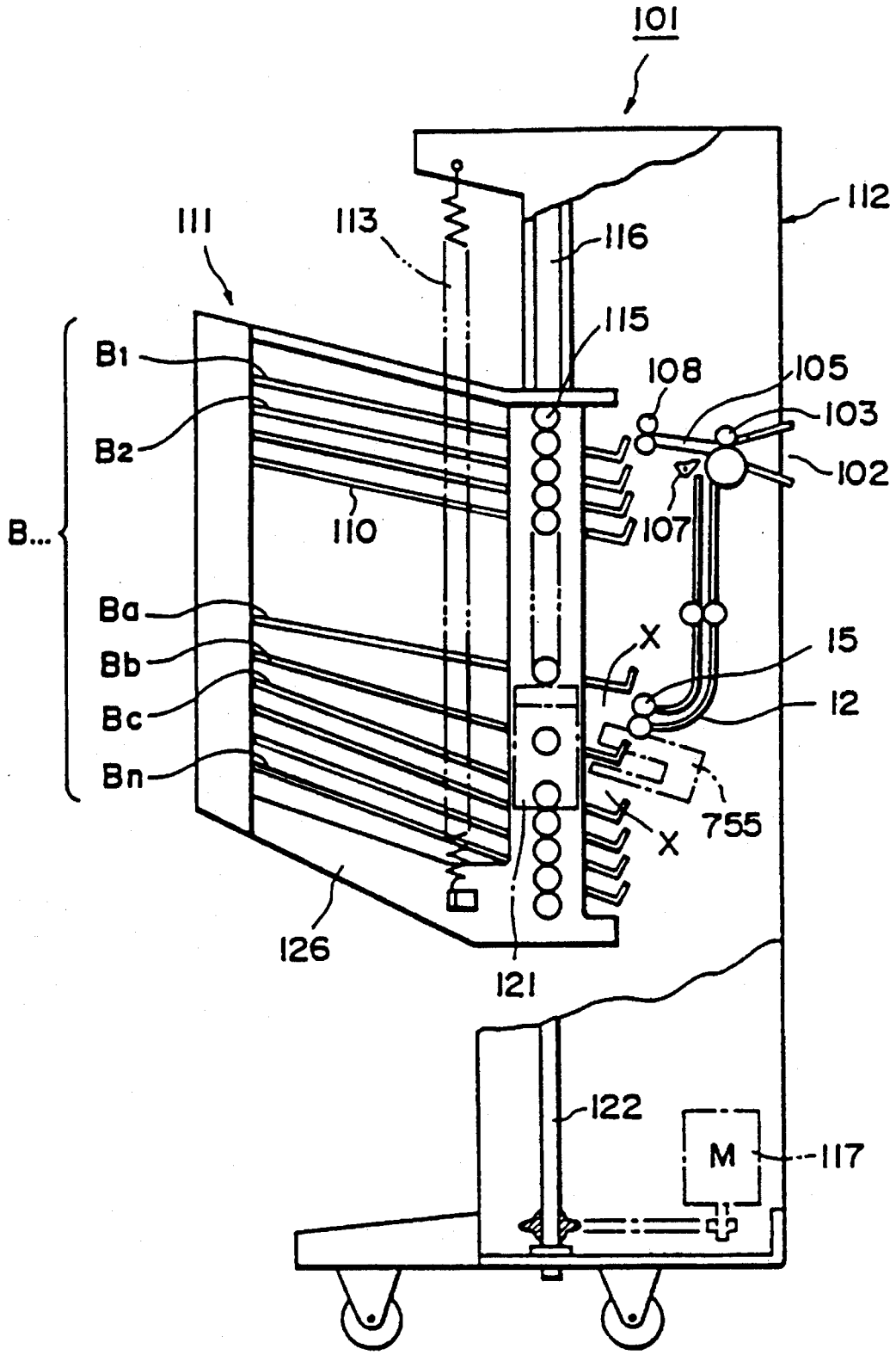
FIG. 41 is a front view of a sorter provided with the mechanism illustrated in FIG. 37.

Referring to FIGS. 39 and 40, another embodiment will be described wherein the mechanism for positioning the automatic stapler 755 at the stapling position is partly modified.

In this embodiment, a frame guide 877 for guiding the bin frame 719 is disposed at the front side of the sorter 101, and an end of a bin frame 719 is slidably engaged in a guiding groove 877a of the frame guide 877.

On the other hand, the automatic stapler 755 has a stapling position stopper 876 fixedly mounted thereto, which abuts the frame guide 877 to position automatic stapler 755 at its stapling position when it is moved to the stapling position.

In the operation, when a sheet S is discharged onto the bin B, the sheet S is aligned along a sheet alignment reference 719c of the bin frame 719 correctly positioned by the frame guide 877, as shown in FIG. 40.

When the sheet stapling operation is carried out, the stapler 755 is moved to the stapling position and is abutted to and positioned by the frame guide 877 for guiding and positioning the sheet alignment reference 719c, so that the sheet accommodated in the bin B is stapled. In this embodiment, the sorter has vertically movable bins, wherein the stapler is positioned and rotatable at a predetermined level. However, the sorter may be of a stationary bin type, and the stapler may be of an elevatable type.

As described in the foregoing, according to this embodiment, a sheet alignment reference member is provided which functions as a reference for aligning the sheets, and a portion substantially integral with the sheet alignment reference member functions as means for positioning the stapler at the stapling position, whereby the stapling position of the stapler can be correctly determined relative to the sheets, and therefore the sheets can be correctly and assuredly stapled.

As shown in FIG. 37, the lead cam 721 is disposed opposed to the lower couple of discharging rollers 109 disposed substantially in the middle of the sorter 101. The lead cam 721 carries on its spiral cam surface a trunion 149 of a bin B coming to a position where the bin B is opposed to the lower couple of the discharging roller 109, and it moves vertically along the guide rail 152, as shown in FIGS. 37 and 13. As shown in FIG. 37, for example, by one full turn rotation in the direction indicated by the arrow A, the lead cam 721 moves the trunion 149c to an intermediate position 721b of the lead cam 721. By a further full turn, the trunion 149c is moved to a position passing through the lead cam 721. At a position opposed to the lower couple of discharging rollers 109, two openings X and X which are larger than the openings between other adjacent bins, are formed between the bin Bb having received a sheet from the lower couple of discharging rollers 109 and the upper and lower adjacent bins Ba and Bc.

While the invention has been described with reference to the structures disclosed herein, it is not confined to the details set forth and this application is intended to cover such modifications or changes as may come within the purposes of the improvements or the scope of the following claims.

What is claimed is:

1. A sheet sorting apparatus with a stapler, comprising:

a plurality of bin trays which are arranged substantially vertically with predetermined clearances between adjacent bin trays, which are inclined to provide an inclined sheet receiving surface and which are independently movable substantially in the vertical direction;

bin tray shifting means for moving said plurality of the bin trays stepwisely substantially in the vertical direction to oppose the respective bin trays to a sheet inlet of said sorting apparatus, while expanding the clearance between the bin tray opposed to the sheet inlet and an upper adjacent bin tray to provide a larger clearance than said predetermined clearances;

a shaft extending substantially perpendicularly to an extension of the inclined sheet receiving surface; and stapling means, supported rotatably about said shaft and having a stapling head movable to above the sheet receiving surface in a lateral direction by rotation about said shaft and an anvil movable to below the sheet receiving surface by the rotation, for stapling the sheets interposed between the stapling head and the anvil;

wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is laterally moved using a space provided by the deviation, and wherein said expanded clearance is smaller than a height of the stapling head.

2. An apparatus according to claim 1, wherein said bin trays are inclined downwardly toward the sheet inlet, and said stapler is disposed adjacent the sheet inlet.

3. An apparatus according to claim 2, further comprising stopper means disposed adjacent the sheet inlet to align ends of the sheet on said bin trays.

4. An apparatus according to claim 3, wherein said bin trays are provided with cut-away portions at corners adjacent to said stapling means.

5. An apparatus according to claim 3, wherein said stopper is substantially perpendicular to the sheet receiving surface.

6. An apparatus according to claim 1, wherein the stapler head is substantially vertically movable.

7. An apparatus according to claim 6, wherein the anvil is not movable in the substantially vertical direction.

8. An apparatus according to claim 7, wherein the anvil has a thickness smaller than a thickness of said bin trays.

9. An apparatus according to claim 1, wherein the predetermined clearances are provided by rollers mounted to lateral sides of said bin trays, and wherein adjacent rollers are contacted to each other.

10. A sheet sorting apparatus with a stapler, comprising:

a plurality of bin trays which are arranged substantially vertically with predetermined clearances between adjacent bin trays, which are inclined to provide an inclined sheet receiving surface and which are independently movable substantially in the vertical direction;

bin tray shirting means for moving said plurality of the bin trays stepwisely substantially in the vertical direction to oppose the respective bin trays to a sheet inlet of said sorting apparatus, while expanding the clearance between the bin tray opposed to the sheet inlet and an upper adjacent bin tray to provide a larger clearance than said predetermined clearances;

a shaft extending substantially perpendicularly to an extension of the inclined sheet receiving surface; and stapling means, supported rotatably about said shaft and having a stapling head movable to above the sheet receiving surface in a lateral direction by rotation about said shaft and an anvil movable to below the sheet receiving surface by the rotation, for stapling the sheets interposed between the stapling head and the anvil;

wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is laterally moved using a space provided by the deviation, and wherein the deviation is larger than a sum of a distance from an end of said stapler to a stapling position and a distance from the stapling position to an end of a sheet on said bin tray.

11. An apparatus according to claim 9, wherein said bin tray shifting means includes a spiral cam means having a spiral groove engageable with the rollers to move substantially vertically by its rotation.

12. An apparatus according to claim 11, wherein those end portions of said bin trays which are remote from the sheet inlet are rotatably and slidably supported.

13. An apparatus according to claim 12, wherein the end potions of the bin trays and those end portions which are close to the sheet inlet are both movable substantially vertically.

14. A sheet sorting apparatus with a stapler, comprising:

a plurality of bin trays which are arranged substantially vertically with predetermined clearances between adjacent bin trays, which are inclined to provide an inclined sheet receiving surface and which are movable substantially in the vertical direction;

bin tray shifting means for moving said plurality of the bin trays stepwisely substantially in the vertical direction to oppose the respective bin trays to a sheet inlet of said sorting apparatus; and stapling means, disposed substantially on an extension of the inclined sheet receiving surface and having a stapling head movable to above the sheet receiving surface and an anvil movable to below the sheet receiving surface by the rotation, for stapling the sheets interposed between the stapling head and the anvil;

wherein said [bintrays] *bin trays* are so disposed that between those ends of adjacent ones of said bin trays which are closer to the sheet inlet are deviated in the direction of movement of the sheet when seen in a direction substantially perpendicular to the sheet receiving surface, and wherein the stapling head is moved using a space provided by the deviation, and wherein said clearance is smaller than a height of the stapling head.

15. A sheet sorting apparatus with a stapler, comprising:

a plurality of bin trays which are arranged substantially vertically with predetermined clearances between adjacent bin trays, which are inclined to provide an inclined sheet receiving surface and which are movable substantially in the vertical direction;

bin tray shifting means for moving said plurality of the bin trays [stepwidely] *stepwisely* substantially in the vertical direction to oppose the respective bin trays to a sheet inlet of said sorting apparatus; and a shaft extending substantially perpendicularly to the extension of the inclined sheet receiving surface;

stapling means, supported rotatably about said shaft and having a stapling head movable to above the sheet receiving surface in a lateral direction by rotation about said shaft and an anvil movable to below the sheet receiving surface by the rotation, for stapling the sheets interposed between the stapling head and the anvil;

wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is laterally moved using a space provided by the deviation, and wherein said clearance is smaller than a height of the stapling head.

*16. A sheet sorting apparatus with a stapler, comprising:*

*a plurality of bin trays which are arranged substantially vertically with predetermined clearances between adjacent bin trays, which are inclined to provide an inclined sheet receiving surface and which are independently movable substantially in the vertical direction;*

*bin tray shifting means for moving said plurality of the bin trays stepwisely substantially in the vertical direction to oppose the respective bin trays to a sheet inlet of said sorting apparatus, while expanding the clearance between the bin tray opposed to the sheet inlet and an upper adjacent bin tray to provide a larger clearance than said predetermined clearances; and*

*stapling means, having a stapling head movable to above the sheet receiving surface and an anvil movable to below the sheet receiving surface, for stapling the sheets interposed between the stapling head and the anvil;*

*wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is moved to above the sheet receiving surface using a space provided by the deviation, and wherein said expanded clearance is smaller than a height of the stapling head.*

*17. An apparatus according to claim 16, wherein said bin trays are inclined downwardly toward the sheet inlet, and said stapler is disposed adjacent the sheet inlet.*

*18. An apparatus according to claim 16, further comprising stopper means disposed adjacent the sheet inlet to align ends of the sheet on said bin trays.*

*19. An apparatus according to claim 18, wherein said bin trays are provided with cut-away portions at corners adjacent to said stapling means.*

*20. An apparatus according to claim 18, wherein said stopper is substantially perpendicular to the sheet receiving surface.*

*21. An apparatus according to claim 16, wherein the stapler head is substantially vertically movable.*

*22. An apparatus according to claim 21, wherein the anvil is not movable in the substantially vertical direction.*

*23. An apparatus according to claim 22, wherein the anvil has a thickness smaller than a thickness of said bin trays.*

*24. An apparatus according to claim 16, wherein the predetermined clearances are provided by rollers mounted to lateral sides of said bin trays, and wherein adjacent rollers are contacted to each other.*

*25. A sheet sorting apparatus with a stapler, comprising:*

*a plurality of bin trays which are arranged substantially vertically with predetermined clearances between adjacent bin trays, which are inclined to provide an inclined sheet receiving surface and which are independently movable substantially in the vertical direction;*

*bin tray shifting means for moving said plurality of the bin trays stepwisely substantially in the vertical direction to oppose the respective bin trays to a sheet inlet of said sorting apparatus, while expanding the clearance between the bin tray opposed to the sheet inlet and an upper adjacent bin tray to provide a larger clearance than said predetermined clearances; and*

*stapling means, having a stapling head movable to above the sheet receiving surface and an anvil movable to below the sheet receiving surface, for stapling the sheets interposed between the stapling head and the anvil;*

*wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is moved to above the sheet receiving surface using a space provided by the deviation, and wherein the deviation is larger than a sum of a distance from an end of said stapler to a stapling position and a distance from the stapling position to an end of a sheet on said bin tray.*

*26. An apparatus according to claim 24, wherein said bin tray shifting means includes a spiral cam means having a spiral groove engageable with the rollers to move substantially vertically by its rotation.*

*27. An apparatus according to claim 26, wherein those end portions of said bin trays which are remote from the sheet inlet are rotatably and slidably supported.*

*28. An apparatus according to claim 27, wherein the end portions of the bin trays and those end portions which are close to the sheet inlet are both movable substantially vertically.*

*29. A sheet sorting apparatus with a stapler, comprising:*

*a plurality of bin trays which are arranged substantially vertically with predetermined clearances between adjacent bin trays, which are inclined to provide an inclined sheet receiving surface and which are movable substantially in the vertical direction;*

*bin tray shifting means for moving said plurality of the bin trays stepwisely substantially in the vertical direction to oppose the respective bin trays to a sheet inlet of said sorting apparatus; and*

*stapling means, having a stapling head movable to above the sheet receiving surface and an anvil movable to below the sheet receiving surface, for stapling the sheets interposed between the stapling head and the anvil;*

*wherein said bin trays are so disposed that between whose ends of adjacent ones of said bin trays which are closer to the sheet inlet are deviated in the direction of movement of the sheet when seen in a direction substantially perpendicular to the sheet receiving surface, and wherein the stapling head is moved using a space provided by the deviation, and wherein said clearance is smaller than a height of the stapling head.*

*30. A sheet sorting apparatus with a stapler, comprising:*

*a plurality of bin trays which are arranged substantially vertically with predetermined clearances between*

*adjacent bin trays, which are inclined to provide an inclined sheet receiving surface and which are movable substantially in the vertical direction;*

*bin tray shifting means for moving said plurality of the bin trays stepwisely substantially in the vertical direction to oppose the respective bin trays to a sheet inlet of said sorting apparatus; and*

*stapling means, having a stapling head movable to above the sheet receiving surface and an anvil movable to below the sheet receiving surface, for stapling the sheets interposed between the stapling head and the anvil;*

*wherein said bin trays are so disposed that between those ends of adjacent ones of said bin trays which are closer to the sheet inlet are deviated in the direction of movement of the sheet when seen in a direction substantially perpendicular to the sheet receiving surface, and wherein the stapling head is moved to above the sheet receiving surface using a space provided by the deviation, and wherein said clearance is smaller than a height of the stapling head.*

* * * * *

UNITED STATES PATENT AND TRADEMARK OFFICE

CERTIFICATE OF CORRECTION

PATENT NO. Re. 35,087

DATED November 14, 1995

INVENTOR(S) Nobutaka UTO, et al.

It is certified that error appears in the above-indentified patent and that said Letters Patent is hereby corrected as shown below:

ON THE TITLE PAGE:

At [56] OTHER PUBLICATIONS

"SN22604, Hironori Shido et al., Jul. 29, 1988." should be deleted.

"SN226061, Hironori Shido et al., Jul. 29, 1988." should be deleted.

"SN 225803, Masataka Naito et al., Jul. 29, 1988." should be deleted.

At [56] U.S. PATENT DOCUMENTS

"4,687,191 8/1987 Stemmle" (second occurrence) should be deleted.

"4,681,320 7/1987 Cooper" should read --4,681,310 7/1987 Cooper--.

After "4,787,616 11/1988 Sasaki et al." the following should be added:

| | | | |
|---|---|---|---|
| --4,930,761 | 06/1990 | Naito et al. | ... 270/53 |
| 5,104,106 | 04/1992 | Shido et al. | ... 270/53 |
| 5,152,511 | 10/1992 | Shido et al. | ... 270/53--. |

UNITED STATES PATENT AND TRADEMARK OFFICE

CERTIFICATE OF CORRECTION

PATENT NO. Re. 35,087 Page 2 of 2

DATED November 14, 1995

INVENTOR(S) Nobutaka UTO, et al.

It is certified that error appears in the above-indentified patent and that said Letters Patent is hereby corrected as shown below:

COLUMN 1:

Line 33, "4295,733" should read --4,295,733--.

Line 34, "are" should read --is--.

Line 62, "a" (first occurrence) should be deleted.

COLUMN 12:

Line 21, "Ben" should read --When--.

COLUMN 15:

Line 61, "shirting" should read --shifting--.

COLUMN 18:

Line 56, "whose" should read --those--.

Signed and Sealed this

Eleventh Day of June, 1996

Bruce Lehman

*Attest:*

BRUCE LEHMAN

*Attesting Officer*

*Commissioner of Patents and Trademarks*